(12) United States Patent
Holmström

(10) Patent No.: US 12,535,694 B2
(45) Date of Patent: Jan. 27, 2026

(54) OPHTHALMIC MULTIFOCAL LENSES

(71) Applicant: VSY Biyoteknoloji ve Ilaç San. A.S., Istanbul (TR)

(72) Inventor: Sven Thage Sigvard Holmström, Istanbul (TR)

(73) Assignee: VSY BIYOTEKNOLOJI VE ILA SAN. A.S., Istanbul (TR)

( * ) Notice: Subject to any disclaimer, the term of this patent is extended or adjusted under 35 U.S.C. 154(b) by 679 days.

(21) Appl. No.: 17/739,804

(22) Filed: May 9, 2022

(65) Prior Publication Data
US 2022/0269110 A1 Aug. 25, 2022

Related U.S. Application Data

(63) Continuation of application No. PCT/EP2019/080758, filed on Nov. 8, 2019.

(51) Int. Cl.
G02C 7/04 (2006.01)

(52) U.S. Cl.
CPC ......... *G02C 7/042* (2013.01); *G02C 2202/20* (2013.01)

(58) Field of Classification Search
CPC ...... G02C 7/042; G02C 2202/20; G02C 7/06; G02C 7/04; G02C 7/041; G02C 7/044;
(Continued)

(56) References Cited

U.S. PATENT DOCUMENTS

| 7,441,894 B2 * | 10/2008 | Zhang | A61F 2/1654 623/6.31 |
| 2009/0088840 A1 * | 4/2009 | Simpson | G02C 7/042 623/6.11 |

(Continued)

FOREIGN PATENT DOCUMENTS

| EP | 0 316 162 A2 | 5/1989 |
| EP | 2 045 648 A1 | 4/2009 |

(Continued)

OTHER PUBLICATIONS

Gori, F. et al., Analytical derivation of the optimum triplicator, dated Dec. 1, 1998, pp. 13-16, Optics Communication 157 (1998) 13-16, Published by Elsevier Science B.V.

(Continued)

*Primary Examiner* — Marin Pichler
*Assistant Examiner* — Kuei-Jen L Edenfield
(74) *Attorney, Agent, or Firm* — Crowell & Moring LLP

(57) ABSTRACT

A new generation ophthalmic multifocal lenses and a method of manufacturing same. The lenses at least provide focal points for near, intermediate and far vision. The lens body provides a refractive focal point for intermediate vision. The lens body comprises a diffraction grating operating as an optical wave splitter, providing a diffractive focal point for near vision and a diffractive focal point for far vision. The lens body comprises a monofocal central zone extending over a distance from the optical axis of the lens body, and provides a focal point coinciding with one of the diffractive focal points. The diffraction grating (91) is arranged from a transition point at a radial position of the lens body where the monofocal central zone ends. At the transition point, the diffraction grating and the monofocal central zone have coinciding amplitude values.

18 Claims, 12 Drawing Sheets

(58) Field of Classification Search
CPC ....... G02C 7/045; G02C 7/049; A61F 2/1618; A61F 2/1654; A61F 2/16; G02B 3/10
USPC .......................... 351/159.1, 159.11–159.15, 351/159.41–159.49, 159.5, 351/159.73–159.79, 159.81
See application file for complete search history.

(56) References Cited

U.S. PATENT DOCUMENTS

| | | | |
|---|---|---|---|
| 2010/0131060 A1 | 5/2010 | Simpson et al. | |
| 2010/0312336 A1 | 12/2010 | Hong et al. | |
| 2011/0234974 A1* | 9/2011 | Lawu | G02C 7/06 623/6.11 |
| 2017/0219846 A1* | 8/2017 | Ando | A61F 2/1654 |

FOREIGN PATENT DOCUMENTS

| | | |
|---|---|---|
| EP | 2 375 276 A1 | 12/2011 |
| WO | WO 2019/020435 A1 | 1/2019 |

OTHER PUBLICATIONS

Romero, L. A. and Dickey, F. M., Theory of optimal beam splitting by phase gratings. I. One-dimensional gratings, dated Jul. 11, 2007, pp. 2280-2295, vol. 24, No. 8, Journal of the Optical Society of America, Aug. 2007.

Rossi M., et al., Refractive and diffractive properties of planar micro-optical elements, dated Sep. 10, 1995, pp. 5996-6007, vol. 34, No. 26, Applied Optics, Optical Society of America, 1995.

International Search Report and Written Opinion, Aug. 3, 2020, pp. 1-14, issued in International Application No. PCT/EP2019/080758, European Patent Office, Rijswijk, The Netherlands.

International Preliminary Report on Patentability, dated Feb. 9, 2022, pp. 1-6, issued in International Application No. PCT/EP2019/080758, European Patent Office, Munich, Germany.

* cited by examiner

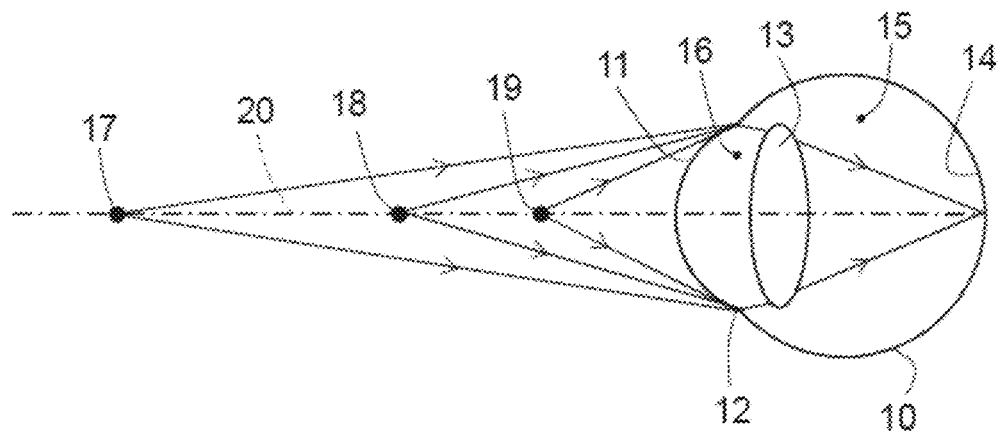
Fig. 1
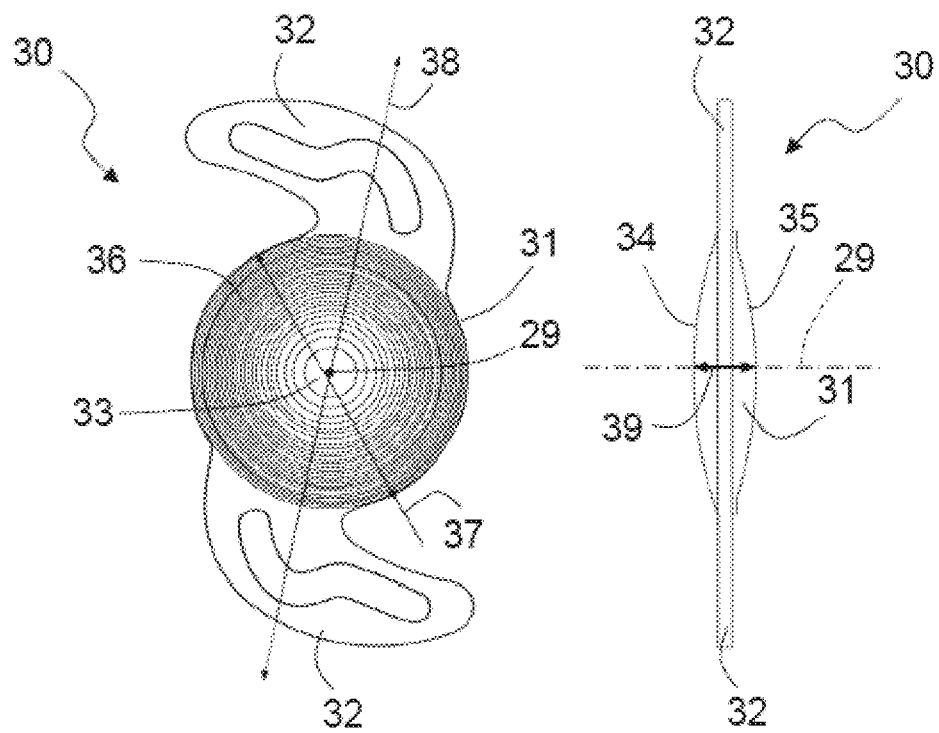
Fig. 2a
(Prior art)
Fig. 2b
(Prior art)

OPHTHALMIC MULTIFOCAL LENSES

PRIORITY

This application is a continuation of PCT/EP2019/080758 filed Nov. 8, 2019, which is entirely incorporated by reference.

TECHNICAL FIELD

The present disclosure generally relates to ophthalmic lenses and, more specifically, to ophthalmic eyeglasses, ophthalmic contact and intra-ocular multifocal diffractive lenses providing diffraction orders with tuned light distributions for different pupil sizes.

BACKGROUND

Ophthalmology is the field of medicine directed to the anatomy, physiology and diseases of the human eye.

The anatomy of the human eye is complicated. The main structures of the eye include the cornea, a spherical clear tissue at the outer front of the eye; the iris, which is the coloured part of the eye; the pupil, an adaptable aperture in the iris that regulates the amount of light received in the eye; the crystalline lens, a small clear disk inside the eye that focuses light rays onto the retina; the retina is a layer that forms the rear or backside of the eye and transforms sensed light into electrical impulses that travel through the optic nerve to the brain. The posterior cavity, i.e. the space between the retina and the lens, is filled with vitreous humour, a clear, jelly-like substance. The anterior and posterior chambers, i.e. the space between the lens and the cornea, are filled with aqueous humour, a clear, watery liquid.

The natural crystalline lens has a flexible, transparent, biconvex structure, and together with the cornea, operates to refract light to be focused on the retina. The lens is flatter on its anterior side than on its posterior side and its curvature is controlled by the ciliary muscles to which the lens connects by suspensory ligaments, called zonules. By changing the curvature of the lens, the focal distance of the eye is changed so as to focus on objects at various distances. To view an object at a short distance of the eye, the ciliary muscles contract, and the lens thickens, resulting in a rounder shape and thus high refractive power. Changing focus to an object at a greater distance requires the relaxation of the lens and thus increasing the focal distance. This process of changing curvature and adapting the focal distance of the eye to form a sharp image of an object at the retina is called accommodation.

SUMMARY

In humans, the refractive power of the crystalline lens in its natural environment is approximately 18-20 dioptres, roughly one-third of the total optical power of the eye. The cornea provides the remaining 40 dioptres of the total optical power of the eye.

With the ageing of the eye, the opacity of the lens increases, due to a clouding of the eye called cataract. Some diseases like diabetes, trauma, but also some medications, and excessive UV light exposure may also cause cataract. Cataract is painless and results in a cloudy, blurry vision. Treatments for cataracts include surgery, by which the cloudy lens is removed and replaced with an artificial one, generally called an intraocular lens, IOL.

Another age-related effect is called presbyopia, which is manifested by difficulty in reading small print or seeing nearby pictures clearly. Presbyopia generally is believed to be caused by a thickening and loss of flexibility of the natural lens inside the eye. Age-related changes also take place in the ciliary muscles surrounding the lens. With less elasticity it becomes harder to focus at objects close to the eye.

A variety of intraocular lenses are also employed for correcting other visual disorders, such as myopia or near-sightedness, when the eye is unable to see distant objects caused by the cornea having too much curvature, for example. The effect of myopia is that distant light rays focus at a point in front of the retina, rather than directly on its surface. Hyperopia or farsightedness, caused by an abnormally flat cornea, such that light rays entering the eye focus behind the retina, not allowing to focus on objects that are close, and astigmatism, which is another common cause of visual difficulty in which images are blurred due to an irregularly-shaped cornea.

In the majority of cases, intraocular lenses are implanted in a patient's eye during cataract surgery, to compensate for the loss of optical power of the removed lens. Traditional IOLs are monofocal, typically providing far (long distance) focus only, requiring the user to use additional ophthalmic lenses (e.g. glasses or contact lenses) for reading, for example. Some modern IOL lenses solve this problem through a multifocal optical design, providing in addition to the far focus also near and/or intermediary vision. Multifocal intraocular lenses, MIOL, existing on the market today, are bifocal or trifocal. In practice, a multifocal ophthalmic lens having four target focal points, i.e. a so-called quad-focal lens, or even multifocal ophthalmic lenses having five target focal points, i.e. a so-called pentafocal lens, are proposed.

Multifocal ophthalmic lenses make use of two optical principles, refraction and diffraction. There are also multifocal contact lenses utilizing these principles. Presbyopia is corrected by eye glasses or contact lenses and may also opt for multifocal optics.

For illustrating the physical difference between these principles, in the present description, the wave model of light is adopted. In this model an electromagnetic wave is propagating in a particular direction with a particular speed, and having a particular wavelength, amplitude and phase.

Refraction is the deflection that a light wave undergoes when travelling from one medium, such as air or liquid, into another medium, such as glass or plastic, having different propagation velocities of the light wave.

Diffraction, in its most basic form, is based on the physical effect that light waves, when impinging on irregularities at an object, become a source of secondary light waves. These secondary waves may interfere with one another in a constructive and destructive manner. Constructive interference occurs when the optical path difference between waves arriving at a particular point is an integer multiple of their wavelength, such that their amplitudes add up in a reinforcing manner. Also called that the waves are in-phase. Destructive interference occurs when the difference in optical path length travelled by interfering light waves is an odd multiple of half of the wavelength, such that a crest of one wave meets a trough of another wave and the waves partly or completely extinguish each other. This is also called that the waves are out-of-phase.

A multifocal ophthalmic lens generally has a biconvex or plano convex shaped or a biconcave or plano-concave shaped lens body, the curvature and thickness of which is adapted to provide a first focal point at its optical axis by refraction. At one or both the anterior and the posterior surface of the lens body a transmissive surface relief or diffraction grating may be provided, comprised of regularly or periodically spaced ridges and/or grooves, designed to diffract transmitted light, and arranged in concentrically rings or zones at a respective surface of the lens body. The periodic spacing or pitch of the ridges and/or grooves substantially determines the points of destructive and constructive interference at the optical axis of the lens. The shape and height of the ridges and/or grooves control the amount of incident light that is provided at a point of constructive interference by diffraction. The points of constructive interference are generally called diffraction orders or focal points. The diffraction relief can be designed such as to provide a second and third focal point of a trifocal lens, different from the refractive focal point, for example.

One common class of multifocal ophthalmic lenses comprises sawtooth type or binary type gratings or reliefs. In this description, the term sawtooth type or jagged type designates a class of transmission diffraction gratings or reliefs comprised of a plurality of repetitive, contiguously arranged, prism shaped transparent diffractive optical elements, DOEs, having a monotonic sloping light receiving surface, such as a linear or curved monotonic sloping light receiving surface. The term binary type reliefs, for the purpose of the present description, designates a class of transmission diffraction reliefs comprised of a plurality of repetitive, spaced apart rectangular or prism shaped transparent DOEs.

For operating as a lens, the repetition period or pitch of a jagged grating has to monotonically decrease in radial direction from the center or optical axis of the lens. Or more specifically, if the first period starts in the center of the lens and the second period starts at $(1*k)^{0.5}$, where k is a positive constant, then the third period starts at $(2*k)^{0.5}$, the fourth at $(3*k)^{0.5}$ and so on. Accordingly, in diffractive optics it is advantageous to represent the grating in the so called $r^2$ space. That is, the parameter along the horizontal axis varies with $r^2$, such that the period occurs at equidistant repetitions.

The period in $r^2$ space can be written as $|2\lambda f|$, where $\lambda$ is the design wavelength, and f the inverse of the optical power of the first diffractive order. While the periods of a diffractive lens are not equidistant, in a physical space they are periodic. One way to see this is to look at the $r^2$ space. A different way to look at it is that, over each period, the difference in optical path length to the focal point increases with a exactly one wavelength $\lambda$. The source of the periodicity is the identical increase in optical path length over each period.

Calculation of the focal points, i.e. the diffractive orders, of such basic reliefs is well known and straightforward for the person skilled in the art of diffractive optical lenses. In general, for use as an ophthalmic lens, the period or pitch of the basic reliefs or gratings is selected to have the first and/or second diffraction orders to provide the target focal points. This, because with these basic reliefs most of the light is diffracted in the lower diffraction orders. In the design process, the relief is constructed having an amplitude profile, such to arrive at a desired intensity profile of the light coupled in the refractive focal point and diffracted in the first and/or second diffraction orders of these basic gratings or reliefs. However, such an approach does not automatically lead to an optimal distribution of the light that incidents the lens, because an amount of light is also distributed into higher diffraction orders, that are not used, which makes tuning or controlling of the relative light distribution between the focal points of the lens difficult for different pupil sizes and that may significantly reduce the overall efficiency of the multifocal lens.

Sharp transitions in the diffraction relief or grating give rise to machining difficulties and, for a finished lens, scattering of light and other related unwanted optical phenomena such as stray light, chromatic aberration, glare i.e. the difficulty of seeing in the presence of bright light such as direct or reflected sunlight or artificial light such as car headlamps at night, and halo effects i.e. white or coloured light rings or spots seen at dim light, i.e. under mesopic conditions. To alleviate such unwanted optical effects, smoothing of the sharp edges of a stepped diffraction relief or grating, by any of curve approximation using sinusoidal and cosine functions, polynomial expressions, filtering or convolution integration using a super-Gaussian function is proposed. The smoothing has the effect that the sharp edges or steps of sawtooth type or binary type DOEs, for example, are stretched or spread in the radial direction of the lens.

When comparing diffractive surfaces, an important factor is the diffractive efficiency. Diffraction efficiency is a measure of how much of the optical power is directed into the desired diffraction orders, or, when talking about diffractive lenses in particular, how much of the optical power is directed into the desired focal points. For bifocal lenses, where the surface of the lens body is optimized to provide an as good vision as possible at two distinct distances, the highest possible diffraction efficiency is reached by using the principles of a phase-matched Fresnel lens, which makes use of a sawtooth or jagged type diffraction pattern. Reference is made to the publication "Refractive and diffractive properties of planar micro-optical elements", by M. Rossi et al., in Applied Optics Vol. 34, No. 26 (1995) p. 5996-6007, which publication is herein incorporated by reference.

Because of the sharp edges of a sawtooth or jagged type diffraction pattern, as a consequence of the discontinuities in the diffraction profile, Fresnel lenses have all the drawbacks described above, in particular with respect to glare and halos, while it is also difficult to fabricate same precisely. However, for a trifocal lens, lenses designed to provide an as good vision as possible to three distinct focal points, the optimal grating is one without any sharp edges.

For the case of a trifocal linear grating with an equal intensity distribution to each order, this is shown specifically in the publication "Analytical derivation of the optimum triplicator", by F. Gori et al., in Optics Communication 157 (1998), p. 13-16, which publication is herein incorporated by reference.

The publication "Theory of optimal beam splitting by phase gratings. I. One-dimensional gratings", by L. A. Romero and F. M. Dickey, in Journal of the Optical Society of America Vol. 24, No. 8 (2007) p. 2280-2295, which publication is herein incorporated by reference, discloses this more generally, proving that at the very least optimal gratings for equal splitting into odd number of orders have continuous profiles. This latter paper provides the mathematical tools to find the optimal linear phase grating for any given set of target orders and any given intensity distribution among those target orders. The optimal grating is defined as the linear diffraction grating with the highest diffraction efficiency for the specified intensity distribution.

It is noted that the publications by Gori et al. and Romero et al. discuss linear phase gratings only with the intent of creating beam splitters.

As disclosed by the International patent application WO2019/020435 of applicant, the trifocal grating from Gori et. al can be used for designing multifocal ophthalmic lenses.

The manner disclosed in WO2019/020435, as will be explained below, is applicable in general to linear gratings.

A linear grating is transformed to a lens, if the shape of the linear grating is identical to the shape of the lens profile in $r^2$ space. A linear grating can be transformed this way by changing the argument to the square of the radius of the lens to be constructed.

WO2019/020435A discloses a general approach for designing multifocal ophthalmic lenses comprising diffraction reliefs or gratings, the diffraction profile of which being specified mathematically by a single continuous closed-form expression or function in radial direction of the lens body.

Such a mathematical expression may represent a phase profile and/or height profile or amplitude profile of a diffraction grating capable of splitting an incident light beam with a highest conceivable efficiency for a given intensity distribution of the amount of light distributed in the target focal points at (−m, +m) diffractive orders, wherein m is a positive integer number. Such gratings include the 0th order (creating the refractive focal point) as the central order. If m=1 a trifocal lens is created, if m=2 a pentafocal lens is provided, etc.

One advantageous way to design such a grating is to first determine the desired target orders and the desired light distribution between these orders and then design the optimal grating providing these properties.

An ophthalmic lens having a continuous periodic phase profile function extending in radial direction of the lens body causes less vision discomfort and disability compared to a lens having a discontinuous or jagged type phase profile function. A function is called continuous when at each point or value of its argument, i.e. the variable, term or expression on which the function operates, (i) the function is defined in such point, (ii) the limits of the function when the argument approaches that point from the right-hand and left-hand exist and are equal, and (iii) the limit of the function as the argument approaches that point is equal to the value of the function in that point.

Lenses having a continuous periodic phase profile function are, inter alia, less sensitive for diopter miscalculation. That is, a miscalculation in the required optical power correction required by a particular user, due to less accurate measurement equipment of a doctor or physician in the case of fitting an intraocular lens, or an optometrist in the case of fitting a contact lens, for example. Further, sensitivity for lens displacement (decentration) in the case of intraocular lenses, which may occur after fitting of the lens, by tilt and dislocation of the lens, is reported to be negligible for lenses having a continuous periodic phase profile function. It also has been observed that such lenses are less probable to produce glare, scattering due to non-uniformities in the path that incident light travels through the lens, and also produce less halos.

Lenses having a continuous periodic phase profile function, especially in the case of being comprised of smooth curves, have the advantage of being easier to manufacture according to a calculated profile compared to sawtooth type or binary type gratings or reliefs, for example.

The above advantages result, for the larger part, from the absence of concentric rings or zones having sharp edges in a diffraction grating having a continuous periodic phase profile function.

Lenses having an optical transfer function or light transmission function of the diffraction grating specified by a continuous periodic phase profile function, provide not only freedom in the selection of target focal points but also control of the distribution of light in each of the selected target focal points. The relative light distribution in the diffractive and/or refractive focal points of such lenses is tuneable by modulating the argument of the phase profile function as a function of the radius or radial distance to the optical axis of the lens body, thereby allowing tuning of the light distribution in the target focal points individually, and differently for different pupil sizes, for example. That is, the lens surface as a whole may be optimized towards multifocality.

In practice, after implantation of an IOL in the human eye, the new focusing properties of the eye as a whole have to be measured. That is, the complete visual system consisting of the new lens and the remainder of the eye of the user is measured integrally, as a first objective indication of the result of the implantation of the IOL. In practice, most physicians rely on a simple measurement by an autorefractometer, for example. An automatic refractometer, or autorefractometer, is a computer-controlled device used during an eye examination to provide an objective measurement of a person's refractive error and prescription for glasses or contact lenses, for example. This is achieved by measuring how light is changed as it enters a person's eye. The autorefractometer can determine when a patient's eye properly focuses an image.

After implanting a multifocal intraocular lens, there is always an adaptation time before the advantages of the lens are fully appreciated by a user. This is due to adaptation processes in the eye and also in the brain of a user. Clinical observations show that after implantation users adopt first to the far focus, and, for a multifocal lens, eventually in a few days or weeks to the two additional focal points, i.e. near and intermediate focus. With a lens fully optimized for multifocality for all pupil sizes, however, the adaptation time also for the far focus will be increased. This is unpleasant and uncomfortable for users.

Although protocols exist for measuring all the foci of the IOL correctly, completely applying such protocols is often perceived as too time consuming, such that the measurement returns only one optical strength of the multifocal IOL. As the measurement is often not even performed by a medical doctor, ophthalmologist or an optometrist, for example, it is routinely assumed by medical professionals that this measurement returns the diffractive far focus, which may lead to erroneous conclusions whether the operation was successful.

For sawtooth type IOLs, for example, the measurement indeed typically returns the far focus. However, for lenses produced in accordance with the teachings of WO2019020435 which, when optimized towards multifocality, provide three or more focal points for different pupil sizes of a user, the thus measured single focal point for these types of IOLs is usually the intermediate focal point, since this is the refractive strength of the lens. It has proven to be very hard to convince persons involved in the measurement that the focal point actually measured with the autorefractometer is not one of the diffractive focal points but most often the intermediate or refractive focal point.

From WO2019020435 it is known that the multifocal properties of an ophthalmic lens may be limited to a first area in radial direction of the surface of the lens body adjacent to the optical axis, while further outwards in radial direction of the lens beyond the first area and towards the circumferential edge of the lens body, the lens may comprise a second area having bifocal properties, for example. Such as providing focal points for intermediate and far vision at this second area. However, when measuring a lens of this type, an autorefractometer will also often only return the intermediate, i.e. the refractive focal point.

Accordingly, there is a need for an improved ophthalmic lens design that provides freedom in targeting three or more diffraction orders or focal points, tuning or controlling of the relative light intensity in all the target focal points, in particular for different pupil sizes, improving the adaptation time of a user or patient and providing a possibility to measure a diffractive focal point easily, either a far or near focal point.

In a first aspect, there is provided an ophthalmic multifocal lens, at least comprising focal points for near, intermediate and far vision. The lens having a light transmissive lens body comprising a diffraction grating extending concentrically in radial direction r from an optical axis of the lens body across part of a surface of the lens body. The lens body being designed for providing a refractive focal point for intermediate vision, and the periodic diffraction grating having phase profile $\phi(r)$ expressed as a single continuous periodic function arranged for varying a phase of incident light at the lens body and operating as an optical wave splitter at least providing a diffractive focal point for near vision at diffraction order $+m$ and a diffractive focal point for far vision at diffraction order $-m$, wherein m is a positive integer value.

The lens body, in accordance with the present disclosure, comprises a monofocal central zone extending over a distance in radial direction r from the optical axis of the lens body across part of the surface of the lens body and having a continuous phase profile function $\varphi(t)$ arranged for varying a phase of incident light at the lens body providing a focal point coinciding with one of the diffractive focal points, wherein the diffraction grating is provided from a transition point at a radial position of the lens body where the monofocal central zone ends. At the transition point, the diffraction grating and the monofocal central zone have coinciding amplitude values.

The present disclosure is based on the insight that by providing a monofocal part at the center of the ophthalmic lens, having a focal point coinciding with one of the diffractive focal points provided by the diffraction grating, after implanting the IOL, for relatively small pupil sizes, one of the targeted diffractive focal points of the complete visual system of a patient, i.e. lens and eye combined, can be accurately measured if the focal point of the monofocal part coincides with one of the targeted diffractive focal points.

Assume a lens designed for providing a target focal point for near vision at diffraction order $+1$, a target focal point for far vision at diffraction order $-1$, and a target intermediate refractive focal point, also indicated as 0 (zero) order. When the focal point of the monofocal central zone coincides with the target focal point for far vision, for example, adaptation of the visual system of a patient, i.e. the combination of lens and eye for the targeted far vision can be measured for pupil sizes in the range of the size of the monofocal central zone. Similarly for a monofocal central zone providing a focal point coinciding with the diffractive focal point for near vision.

A typical autorefractometer will measure at the perimeter of the pupil of the patient. However, a doctor often will measure in light conditions that render the pupil to be approximately 3 mm or less in diameter. A typical size of the pupil when measuring a lens manufactured according to the present disclosure has a diameter of about 1-2 mm. Hence, with such dimensions, a person performing the measurement knows that the measurement returns a result based on the focal point of the monofocal central zone.

Further, with the present disclosure, a strong far or near focus provided by the monofocal central zone is available for a large range of pupil sizes. In outside ambient and/or day-time conditions, the far or near focus will dominate.

This leads to a faster adaptation time for the focus provided by the monofocal central zone and a more comfortable experience until all foci are accepted by the visual system of the user, compared to prior art multifocal lenses, such as disclosed by WO2019020435, for example.

As mentioned above, from the absence of concentric rings or zones having sharp edges, lenses having a continuous periodic phase profile function provide the advantage of being less probable to produce glare or scattering due to non-uniformities in the path that incident light travels through the lens, and also to produce less halos, while being easier to manufacture according to a calculated profile compared to sawtooth type or binary type gratings or reliefs, for example.

These advantages are maintained by the present disclosure, in that a transition point at a radial position of the lens body where the monofocal central zone ends and the diffraction grating starts, the height profile or amplitude profile of the monofocal central zone and the height profile or amplitude profile of the diffraction grating have coinciding amplitude values. That is, at the transition point a jump in the amplitude or height of the overall optical profile of the lens transverse to the surface of the lens body is effectively avoided, thereby avoiding non-uniformities in the path that incident light travels through the lens.

An important step in the manufacturing of ophthalmic lenses by micro machining or diamond turning, for example, is mechanical polishing to get rid of cutting traces. It is necessary to get rid of all visible cutting traces to comply with quality requirements and medical regulations for intraocular lenses. Getting extremely low levels of cutting traces, however, requires expensive machinery as well as slow cutting. If lenses are polished after cutting the machine can be allowed to work faster.

Sharp angles in the height profile of diffractive lenses complicate the mechanical polishing. If mechanical polishing is not possible in view of the height profile of the lens, one needs to either utilize chemical polishing, which requires dangerous chemicals, or manufacture lenses without requiring polishing. The latter leads to much increased manufacturing costs because of one or both of lower yields and more expensive machinery.

Smooth diffractive geometries in accordance with the present disclosure allow for polishing and therefore lead to a significant increase in yield, compared to lenses having sharp transitions in their height profile.

In an embodiment of the ophthalmic multifocal lens according to the present disclosure, wherein the diffraction grating comprises a wave-type diffraction pattern, i.e. the phase profile $0(r)$ of the periodic diffraction grating comprises a continuous wave type function, having alternating crest and trough amplitude values, the transition point being located closer to a crest amplitude value than a trough amplitude value of the diffraction grating.

It has been observed that the diffraction efficiency of the lens is increased when the transition point occurs closer to a crest value than a trough value of the diffraction grating. That is, when the transition point is close to a peak of the diffraction grating near the surface of the lens body.

In another embodiment of the ophthalmic multifocal lens according to the present disclosure, a distance between the transition point and such crest amplitude value measured in radial direction r of the lens body, when viewed in $r^2$ space, is less than 0.25 of the period or pitch distance of the diffraction grating in $r^2$ space, preferably less than 0.2 times the period or pitch distance of the diffraction grating in $r^2$ space.

The period of a diffraction grating can be determined most easily from measuring the diffraction profile of the diffraction grating and by displaying the measurements with a squared r axis.

Hence, a relative smooth transition from the amplitude profile of the monofocal central zone to the amplitude profile of the diffraction grating and improved diffraction efficiency is obtained by positioning the transition point at a rising or falling edge of the amplitude profile of the diffraction grating aside the crest amplitude value.

That is, the monofocal central zone and the diffraction grating merge at one of a leading or rising edge, and a falling or trailing edge of a particular crest amplitude value of the diffraction grating, i.e. such edge of a wave-type periodic diffraction profile the distance of which to the surface of the lens body decreases with decreasing radial distance in either direction towards this crest amplitude value.

In an embodiment of the present disclosure, the transition point is set by adapting at least one of a radius of the monofocal central zone, an argument and/or amplitude of an amplitude profile $H(r)$ of the diffraction grating, based on the phase profile function $\phi(r)$ of the diffraction grating, and an argument and/or amplitude of an amplitude profile $h(r)$ of the monofocal central zone, based on the phase profile function $\varphi(r)$ of the monofocal central zone.

The diffraction grating and the monofocal central zone of the ophthalmic multifocal lens according to the present disclosure may extend in radial direction r across part of the surface of the lens body both symmetrically and asymmetrically with respect to the optical axis of the lens body. In the asymmetric embodiment, the optical axis may comprise a point of the surface of the lens body displaced in radial direction r from the center of the lens body. The symmetric embodiment is mostly applied in practice.

In an embodiment of the ophthalmic multifocal lens according to the present disclosure, one or both an argument and amplitude of the periodic phase profile $\phi(r)$ of the diffraction grating are variable as a function of a distance in radial direction r from the optical axis of the lens body.

From WO2019020435 it is known that the light distribution in the focal points of an ophthalmic lens comprising a diffraction grating having a continuous periodic phase profile function is excellently tuneable over a relative large intensity range, by modulating one or both of the argument and amplitude of the phase profile function as a function of the radius or radial distance to the optical axis of the lens body.

In this manner, for various pupil sizes, a desired relative light distribution in each of the focal points of the lens can be effectively established, despite of, or thanks to, the contribution of the monofocal central zone to the amount of light in one of the diffractive focal points according to the present disclosure, and to correct any influence on a targeted light distribution in the focal points of the lens by setting the transition point by any of the measures mentioned above, such as adapting the radius of the central zone and/or adapting the amplitude of the amplitude profile $h(r)$ of the central zone and/or adapting the argument and/or amplitude of the amplitude profile $H(r)$ of the diffraction grating.

In an embodiment of the ophthalmic multifocal lens according to the present disclosure, the lens body, the diffraction grating and the monofocal central zone are arranged for: providing monofocal properties at a first area of the lens body including the optical axis, a focal point of this first area coinciding with one of diffractive focal points provided by the diffraction grating, providing multifocal properties at a second area of the lens body extending beyond the first area in radial direction of the lens, and providing bifocal properties at a third area of the lens body extending beyond the second area in radial direction of the lens towards a circumferential edge of the lens body.

With this embodiment, the multifocal properties of the ophthalmic lens are limited to a second area in radial direction of the surface of the lens body, positioned between the monofocal central zone, i.e. the first area of the lens, and the circumferential edge of the lens body. Further outwards in radial direction of the lens body, beyond the second area and towards the circumferential edge of the lens body, the lens comprises a third area having bifocal properties.

A lens of this type provides an optimized diffraction efficiency optimally tuned to the pupil size of a user. The dimensions of the first, second and third area are arranged such that for strong or relatively strong ambient light conditions, for example when reading a book, the pupil size of the human eye mainly covers the first and second area of the lens, such that most of the optical power should be directed to the focal points for near and intermediate vision. At low light conditions, such as when driving a vehicle at night, for example, the pupil size is relatively large, covering almost the whole surface area of the lens, such that most of the optical power should be directed to the focal points for intermediate and far vision. Those skilled in the art will appreciate that in a practical embodiment the ratios of the optical power between the focal points at a respective surface area depend on whether the monofocal first area of the lens contributes to either one of the focal points for near or far vision.

In an embodiment of the ophthalmic multifocal lens according to the present disclosure, the monofocal central zone produces a focal point coinciding with the diffractive focal point for far vision.

It has been observed that after implantation of an IOL, patients can make the adaptation to far vision faster than to one or both of the near and intermediate vision, for example. The above-mentioned embodiment will provide patients one well-defined single focus, i.e. the focus for far vision, to which the patient quickly adapts and which will enable the patient to carry out very well the majority of daily activities already at an earlier stage after implantation. Further, this embodiment makes it easier for doctors to evaluate the lens, as they know that the specified monofocal central zone only provides the far focus. When the visual system is measured with an (auto)refractometer while the dimensions of the pupil of the patient are smaller than the dimensions of the monofocal central zone, it is guaranteed that the far focus is measured.

Ophthalmic lenses according to the present disclosure having the transition point at a radial position such that the monofocal central zone or first area has a diameter in the range of 0.8-1.3 mm, and having the phase profile function $\phi(r)$ of the diffraction grating and the phase profile function $\varphi(r)$ of the monofocal central zone designed such that a ratio of intensities of incident light distributed in the target focal points for far and near vision is in a far/near ratio range of 0.8-2.0, cover in practice the majority of lenses to be implanted.

The shape or height profile of the monofocal zone may be selected among a plurality of continuous refraction profiles known from monofocal lenses. Aspherical surfaces are among the most general known shapes of monofocal lenses known in practice.

In an embodiment of the multifocal ophthalmic lens according to the present disclosure, the monofocal central zone comprises a continuous phase profile function φ(r) defined by:

$$\varphi(r) = -2\pi \frac{\sqrt{r^2 + f^2} - f}{\lambda} \quad (1)$$

wherein: r is distance in radial direction from the optical axis of the lens body, [mm], f is focal distance of the monofocal central zone, [mm], and I design wavelength, [mm].

In the paraxial approximation, using geometrical or ray optics, wherein the angle θ between such rays and the optical axis of the lens remains small, i.e. «1 rad, such that it can be assumed that tan θ=sin θ=θ, the above phase profile function (1) of the monofocal central zone reduces to:

$$\varphi(r) = -\pi \frac{r^2}{\lambda f} \quad (2)$$

An alternative refraction profile for the monofocal central zone is defined by:

$$z(r) = \frac{r^2}{R\left(1 - \sqrt{1 - (1+\kappa)\frac{r^2}{R^2}}\right)} + \sum_{n=Z}^{m} A_{2n} h^{2n} \quad (3)$$

wherein: z(r) is the sag at the distance r from the optical axis,
r is distance in radial direction from the optical axis of the lens body, [mm],
R is the radius of curvature, [mm],
K is the conic constant, defining the shape of the lens,
h is the radial coordinate (from the optical axis), and
$A_{2n}$ are coefficients of a correction polynomial (allowing for higher order aspheric optical elements).

The term 'sag' can be thought of as when starting with a cylinder, then cutting the aspheric lens from one of the ends z(r) provides the depth to cut to at each distance h from the central optical axis, where R is the radius of curvature of the cylinder.

As mentioned previously, it is often advantageous to provide a desired multifocal grating calculated for a linear phase grating and then transform that grating into a diffractive lens or a part of a diffractive lens. It is for example proven in Gori et al. that the optimal way to create an optical triplicator, i.e. a beam splitter that splits the incoming light into three orders with equal intensity at each order is provided by:

$$\phi_{lin}(x) = \tan^{-1}[2.65718 \ldots \sin 2\pi x] \quad (4)$$

wherein: $\phi_{lin}(x)$ is the phase profile of a linear phase grating,
x is the axis or distance over which the grating extends, [mm].

With this definition one period is exactly 1 unit long.

In an embodiment of the multifocal ophthalmic lens according to the present disclosure, the diffraction grating is arranged for operating as a wave splitter and comprises two diffractive focal points at diffraction orders +1 and −1, and wherein the phase profile function is expressed by a single continuous periodic closed-form expression or function as disclosed by WO2019020435, i.e.:

$$\phi(r) = A(r) * F\left[a(r) * G\left(\frac{2\pi(r^2 - S(r))}{r}\right)\right] + B(r) \quad (5)$$

wherein: r is the radial distance or radius outwardly from the optical axis of the lens body, [mm],
A(r) is an amplitude modulation function of the phase profile function in radial direction of the lens body,
F[α*G] is a function in radial direction of the lens body providing the wave splitter operation,
G(r) is a continuous periodic function in $r^2$ space,
a(r) is an argument magnitude modulation function of G,
S(r) is an argument angle modulation function of G in $r^2$ space, [mm$^2$],
T is a period or pitch of the diffraction grating in $r^2$ space, [mm$^2$], and
B(r) is an amplitude modulation function of the continuous periodic phase profile function,
wherein at least one of the argument magnitude modulation function a(r) and the argument angle modulation function S(r) comprises the argument modulated as a function of the radial distance to the optical axis of the lens body.

In equation (4) the linear phase grating with the highest diffraction efficiency for a trifocal beam splitter with equal intensity distribution is defined. If the argument is changed from x to $x^2$ a phase profile with the correct zone distances for a lens is provided. If this is applied to the phase profile function φ(r) in equation (5) F[α*G] then is an inverse tangent function and G(r) a sine function. With S(r)=0, A(r)=1 and B(r)=0, we arrive at a diffractive grating that, when viewed in $r^2$ space, looks identical to the linear phase grating. As a lens, it is a continuous periodic phase profile function of a planar diffraction grating splitting an incident light beam with the highest efficiency in the focal points at the ±1 diffractive orders and the 0th order.

Both a(r) and S(r) may be independently selected for modulating the argument of the above-mentioned continuous periodic phase profile function (4) for tuning the light distribution in the target focal points, for different pupil sizes.

A constant value of the argument angle modulation function S(r) represents a phase shift of the continuous periodic phase profile function and determines the start of the slope of the phase profile function and thereby whether more light is diffracted in the +1 diffraction order or whether more light is diffracted in the −1 diffraction order, dependent on the sign and value of the phase shift, respectively.

It is advantageous to express the phase shift S(r) as a fraction of the period T of the grating, such as S=±0.25*T. Those skilled in the art will appreciate that a particular phase shift including integer values of the period T of the diffraction grating will take the same effect as a corresponding phase shift within a single period T.

In accordance with the present disclosure, the light distribution in the diffractive and refractive focal points may be further tuned by an adaptation of at least one of the amplitude modulation function A(r) and the amplitude modulation function B(r) of the continuous periodic phase profile function (5).

The amplitude modulation functions A(r) and B(r) provide a further control of the amount of light that is distributed between the ±1 diffraction orders and the 0th order dependent on the pupil size. In general, provided that the largest phase retardation in the phase profile is below the design wavelength, an increase of any or both of the amplitude modulation functions will increase the amount light diffracted in the ±1 diffraction orders, i.e. the diffractive focal points, compared to the 0th order or refractive focal point, while a decrease of any or both of the amplitude modulation functions will increase the amount of light provided in the refractive focal point compared to the diffractive focal points.

The amplitude modulation functions may vary as a function of the radial distance from the center or optical axis of the lens, for apodizing purposes. Changing the amplitude is a manner to control the relative light intensity in the intermediate, i.e. the refractive, focal point. In practical embodiments, according to the present disclosure, the amplitude modulation functions A(r) and B(r) may be constant over part of the lens body.

By the argument magnitude modulation function or light distribution parameter a(r) the amount of light that is distributed in the 0th order, i.e. the focal point of intermediate vision in the present disclosure, can be tuned. In accordance with the present disclosure, a(r) may have a constant value across part of the lens body. In practice, values of a(r) may range between 2 and 3, for example.

Accordingly, in an embodiment of the ophthalmic lens according to the present disclosure, the phase profile function (4) of the diffraction grating is reduced defined to:

$$\phi(r) = A(r)\tan^{-1}\left[a(r)*\sin\left(\frac{2\pi(r^2 - S(r))}{T}\right)\right] \quad (6)$$

wherein: S(r) has a constant value ranging between −0.5*T and 0.5*T in $r^2$ space,
A(r) has a constant value, and
a(r) has a constant value ranging between 2.5 and 3.

The value of the amplitude modulation function A(r) may be constant over the lens surface, such as between 1.05-1.15, for example, in order to take into account a reduction in the height of the diffractive grating by a finishing operation of the lens, such as by polishing. For lens bodies not requiring such a finishing operation, the value of A(r) may be 1.

Although the phase profile function of the monofocal central zone and/or the phase profile function of the diffraction grating may be calculated mathematically analytically, in accordance with the present disclosure, any or both of the phase profile functions may be provided by computer calculations, wherein the phase profile function is represented by a Fourier series and each diffraction order is represented by a respective Fourier coefficient. The phase profile function may be calculated such that a summation of squared absolute values or weighted squared absolute values of Fourier coefficients of diffraction orders associated with the target focal points is maximum.

In equation (4) the optimal linear phase grating for a trifocal grating with equal intensity distribution is shown. It is often advantageous to design a specific optical grating with the required properties. In the already mentioned paper by Romero et al., a methodology is disclosed to find an optimal linear phase grating for a desired set of target focal points and a specified intensity distribution among these. For the case of a trifocal grating the complete, non-simplified formula of the linear phase grating $\phi_{lin}(x)$ based on Romero et al. is:

$$\phi_{lin}(x) = \tan^{-1}\left(\frac{\mu_1\gamma_1\sin(-x*2\pi + \alpha_1) + \mu_2\gamma_2\sin(\alpha_2) + \mu_3\gamma_3\sin(x*2\pi + \alpha_3)}{\mu_1\gamma_1\cos(-x*2\pi + \alpha_1) + \mu_2\gamma_2\cos(\alpha_2) + \mu_3\gamma_3\sin(x*2\pi + \alpha_3)}\right) \quad (7)$$

wherein:
$\gamma_1, \gamma_2, \gamma_3$ represent the relative intensities of the respective diffraction orders −1, 0, 1, respectively,
$\alpha_1, \alpha_2, \alpha_3$ represent the phases of the respective Fourier coefficients of the phase profile function,
$\mu_1, \mu_2, \mu_3$ are constants to be optimized, and
$|\alpha_k|/\gamma_k=N$, wherein N is a positive constant, and $|\alpha_k|$ represents the amplitude of Fourier coefficient $\alpha_k$ of the diffraction grating, for k=1, 2, 3,
x is the axis over which the grating extends.
With this definition one period is exactly 1 unit long.

The grating in equation (7) can be used for the trifocal part of the lens by substituting x with the square of the lens radius r. More precisely, to arrive at the equivalent of equation (5) x should be replaced by $1/T\{r^2-S(r)\}$.

A lens equation equivalent to equation (5) above can now be formed from the linear grating in equation (7).

Using the phase profile $\phi_{lin}(x)$ as defined in (7) one arrives at:

$$\phi(r) = A(r)*\phi_{lin}\left(\frac{r^2 - S(r)}{T}\right) + B(r) \quad (8)$$

wherein:
$\phi(r)$ is a continuous periodic phase profile function of the lens diffraction grating,
r is the radial distance or radius outwardly from the optical axis of the lens body, [mm],
A(r) is an amplitude modulation function of the continuous periodic phase profile function,
B(r) is an amplitude modulation function of said continuous periodic phase profile function,
S(r) argument angle modulation function in $r^2$ space, [$mm^2$], and
T period or pitch of the diffraction grating in $r^2$ space, [$mm^2$].

It is noted that because of the way the theory from Romero et al. is applied here the focal points for far and near vision correspond to the positive and negative diffraction orders, respectively. That is just the opposite as used otherwise in the description of the present application. From a theoretical point of view this reversal of the orders and focal points is irrelevant.

From the mathematics by Romero et al. for finding the optimal trifocal grating with an equal split over the orders (−1, 0, +1) we arrive at the following equation:

$$\phi_{lin}(x) = \tan^{-1}(2.65718\ldots *\cos 2\pi x) \quad (9)$$

This definition is identical to equation (4) above, except for a 90 degree (0.25*T) shift. This shift needs to be accounted for when making the lens by appropriately changing S(r) to take this into account.

If instead of an equal intensity distribution a diffraction grating is to be provided having a (near, intermediate, far) split of (1.2, 1, 1), for example, a way to express an optimal diffractive grating fulfilling these requirements is by applying the teachings of Romero et al. in terms of equation (7), having the constants set as follows:

$$\left.\begin{array}{l}(\gamma_1, \gamma_2, \gamma_3) = (1.2, 1, 1)\\(\alpha_1, \alpha_2, \alpha_3) = \left(\frac{\pi}{2}, 0, \frac{\pi}{2}\right)\\(\mu_1, \mu_2, \mu_3) = (1.37, 1, 1.29)\end{array}\right\} \quad (10)$$

In another embodiment of the multifocal ophthalmic lens according to the present disclosure, the diffraction grating is arranged for operating as a symmetric optical wave splitter comprising diffractive focal points at diffraction orders +1, 0 and −1, and wherein the single continuous periodic phase profile function φ(r) of the lens diffraction grating is defined by equations (8) and (7) above. In a particular embodiment the constants according to equation (10) are applied in equations (7) and (8).

The surface of the lens body can also be modified by applying Fourier filtering or convolution with a kernel, or other known signal processing methods may be applied to smoothen or slightly reshape the lens profile to change the energy distribution between the diffraction orders or to remove unwanted stray light. Such modifications are often easier to apply in $r^2$ space.

It is further noted that the teachings according to the present disclosure are equally applicable for designing and tuning the light distribution of a multifocal ophthalmic lens having four target focal points, i.e. a so-called quad-focal lens, or even a multifocal ophthalmic lens having five target focal points, i.e. a so-called pentafocal lens.

Numerical methods may be required for calculating the phase function or phase profile function for providing a desired light distribution in the refractive and diffractive focal points of a symmetric or asymmetric beam splitter at least having focal points for near and far vision different than the first diffractive orders ±1 as elucidated above.

In a second aspect, the present disclosure provides a method of manufacturing an ophthalmic multifocal lens, at least comprising focal points for near, intermediate and far vision, the lens having a light transmissive lens body comprising a diffraction grating extending concentrically in radial direction r from an optical axis of the lens body across part of a surface of the lens body, the lens body being designed for providing a refractive focal point for intermediate vision, the diffraction grating having a phase profile φ(r) expressed as a single continuous periodic function arranged for varying a phase of incident light at the lens body and operating as an optical wave splitter at least providing a diffractive focal point for near vision at diffraction order +m and a diffractive focal point for far vision at diffraction order −m, wherein m is a positive integer value, the method comprising the steps of:
  providing a monofocal central zone extending over a distance in radial direction r from the optical axis of the lens body across part of the surface of the lens body and having a continuous phase profile function φ(r) arranged for varying a phase of incident light at the lens body providing a focal point coinciding with one of the target focal points for far and near vision,
  determining an amplitude profile H(r) of the diffraction grating based on the phase profile function φ(r) of the diffraction grating, and an amplitude profile h(r) of the monofocal central zone based on the phase profile function φ(r) of the monofocal central zone,
  determining a transition point at a radial position of the lens body where the monofocal central zone ends, at the transition point the diffraction grating and the monofocal central zone have coinciding amplitude values, and
  applying the monofocal central zone and the diffraction grating in accordance with the determined transition point.

The amplitude profile or height profile of the monofocal central zone and the diffraction grating of the lens, specifying the height and position of the varies DOEs that extend as ring, oval or other rotational shaped zones at the surface of the lens concentric to the optical axis or center of the lens, can be applied in the lens body by any of laser micro machining, diamond turning, 3D printing, or any other machining or lithographic surface processing technique, for example. A lens with the same optical effect can also be created by holographic means, using a holographic optical element to spread the light to the desired foci.

In an embodiment of the method of manufacturing an ophthalmic multifocal lens according to the present disclosure, wherein the diffraction grating comprises a wave type diffraction pattern, having alternating crest and trough amplitude values, the transition point is determined to be located closer to a crest amplitude value than a trough amplitude value of the diffraction grating.

In particular, wherein the transition point is located such that a distance between the transition point and the crest amplitude value measured in radial direction r of the lens body, when viewed in $r^2$ space, is less than 0.25 times the period or pitch distance of the diffraction grating in $r^2$ space, preferably less than 0.2 times the period or pitch distance of the diffraction grating in $r^2$ space.

In another embodiment of the method of manufacturing an ophthalmic multifocal lens according to the present disclosure, at least one of the amplitude profile h(r) of the monofocal central zone and the amplitude profile H(r) of the diffraction grating is adapted to provide coinciding amplitude values of the monofocal central zone and the diffraction grating at the transition point.

In a further embodiment of the method of manufacturing an ophthalmic multifocal lens according to the present disclosure, the transition point and a shift in radial direction of the diffraction grating are determined based on the distribution in the target focal points of light incident on the lens, such that for a given aperture size:
  intensities of light distributed in each of the target focal points are within a predetermined intensity range for each individual target focal point, and
  a sum intensity of light distributed in the target focal points is in a predetermined summation range, and
  a ratio of intensities of light distributed in the target focal points for far and near vision is in a predetermined ratio range.

The lens body may comprise any of Hydrophobic Acrylic, Hydrophilic Acrylic, Silicone materials, or any other suitable light transmissive material.

The continuous phase profile function and the height profile of the lens in the method according to the present disclosure may be provided remote from the equipment for manufacturing the lens. Particularities of the height profile of the diffraction grating of the lens may be forwarded to the manufacturing site or equipment by data transfer over a telecommunication network available in practice, such as the Internet.

Tuning and smoothing of the optical properties and the light distribution in the target refractive and diffractive focal points may be applied such that the amount of light diffracted in a particular focal point or order is spread or smeared out over part of the optical axis, to provide an ophthalmic lens having enhanced depth of focus, ED, properties.

In a third aspect the present disclosure provides an ophthalmic multifocal lens as disclosed above, arranged as one of a contact lens, an intraocular lens, an aphakic contact lens, an aphakic intraocular lens, and a spectacle lens. It is to be noted that in the case of an intraocular lens, the lens body generally takes the form of biconvex or plano-convex optically transparent disk. In the case of a contact lens or spectacle or eyeglass lens, the lens body may take any of a biconvex or plano convex and biconcave or plano-concave shape or combinations thereof, whether or not enhanced by further optical corrections arranged at or in the optically transparent body.

These and other aspects of the disclosure will be apparent from and elucidated with reference to the examples described hereinafter.

SHORT DESCRIPTION OF THE FIGURES

FIG. 1 illustrates, in a schematic manner, focusing of light beams from several distances at the human eye.

FIG. 2a illustrates, in a schematic manner, a top view of a typical prior art multifocal aphakic intraocular lens.

FIG. 2b illustrates, in a schematic manner, a side view of the multifocal aphakic intraocular lens shown in FIG. 2a.

Figure 4A:
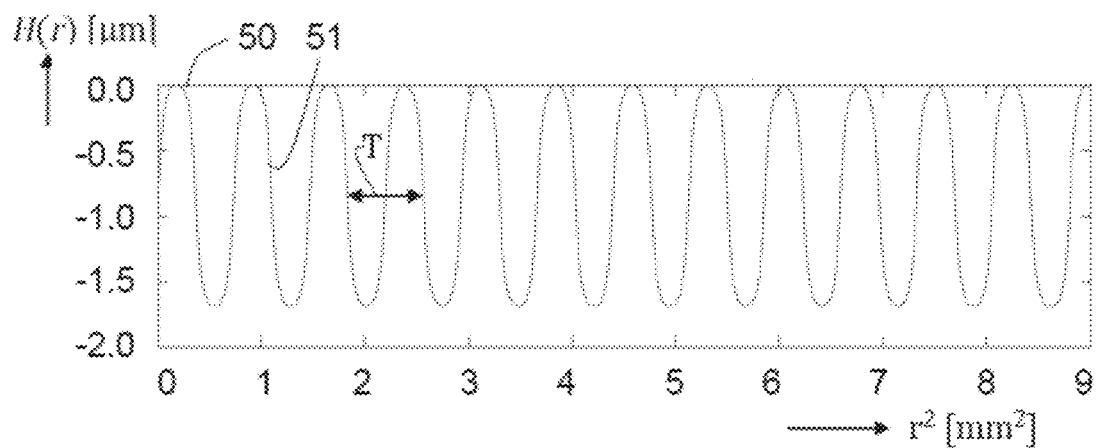

FIG. 4a schematically, graphically illustrates an example of a height profile and computer simulated light distribution of a continuous periodic diffraction grating on a biconvex lens body of an embodiment of a prior art multifocal aphakic intraocular lens as disclosed by WO2019020435.

Figure 4B:
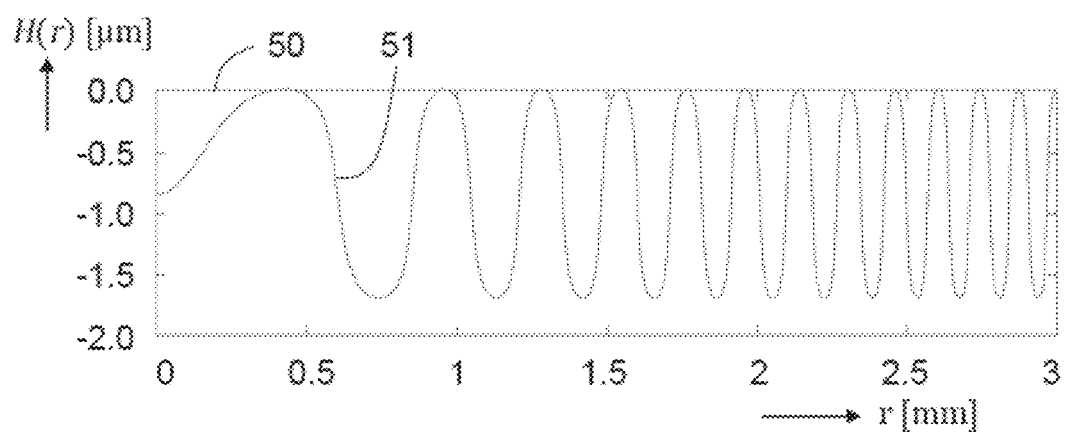

FIG. 4b shows an example of the same height function as in FIG. 4a, along a linear scale as function of the radial distance r, based on a phase profile function $\phi(r)$.

Figure 4C:
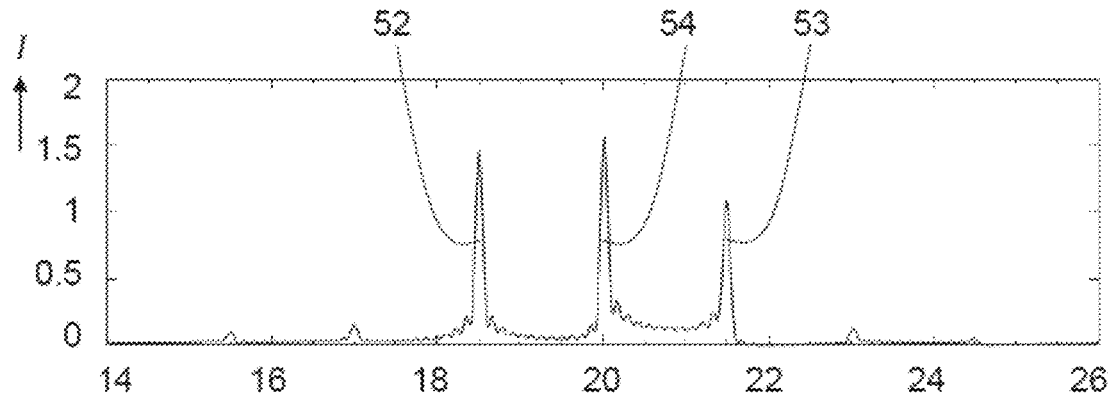

FIG. 4c shows an example of an amount of light diffracted by the lens having the height profile of FIG. 4b.

Figure 5A:
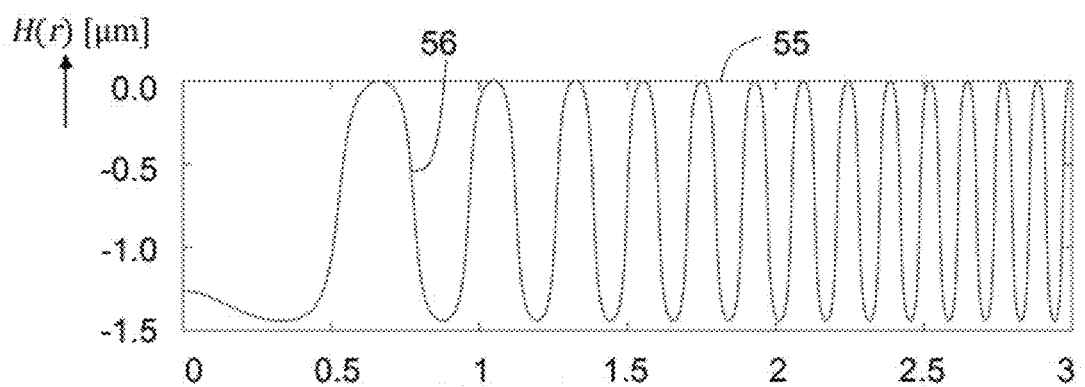

FIG. 5a, schematically, graphically illustrates an example of a height profile and computer simulated light distributions of a continuous periodic diffraction grating on a biconvex lens body of an embodiment of a prior art multifocal aphakic intraocular lens as disclosed by WO2019020435.

Figure 5B:
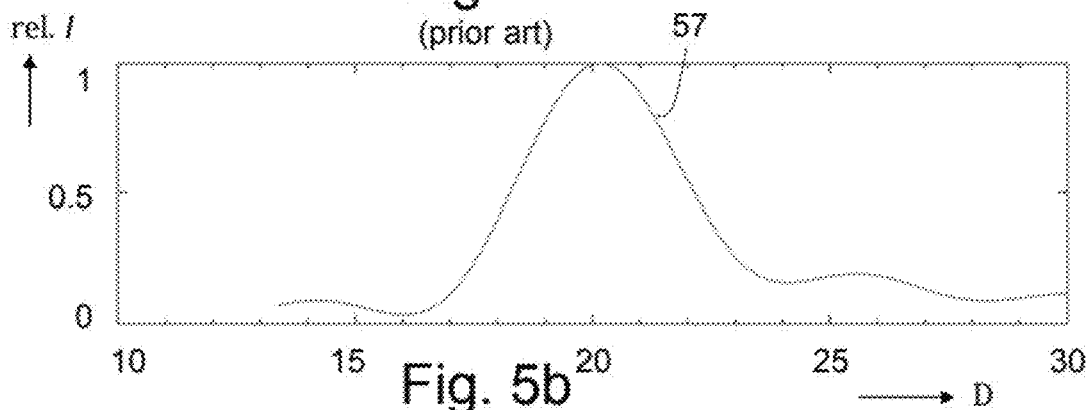

FIG. 5b shows the light intensity distribution for a pupil size having a diameter of 1 mm.

Figure 5C:
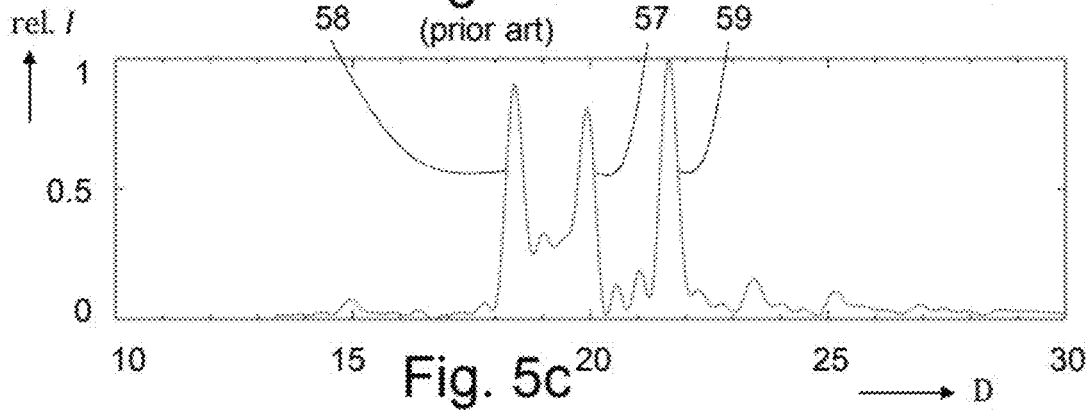

FIG. 5c shows the light intensity distribution for a pupil size having a diameter of 3 mm.

Figure 5D:
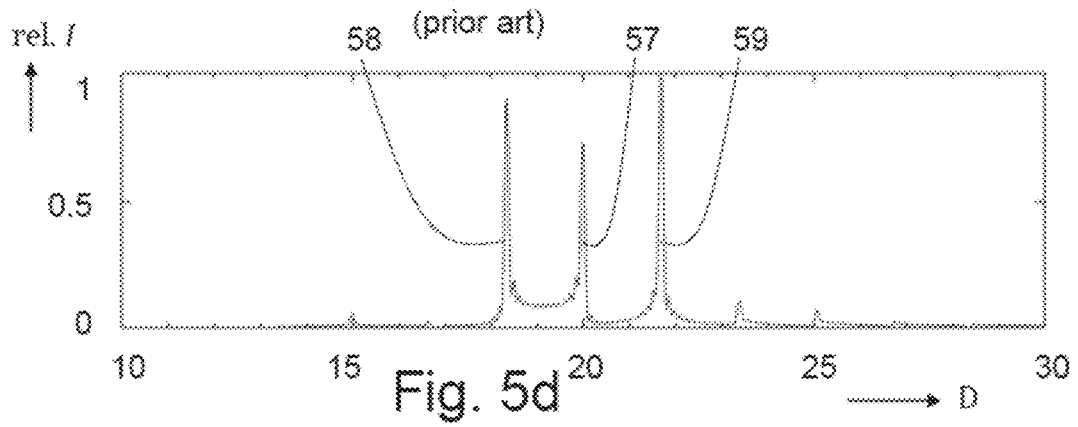

FIG. 5d shows the light intensity distribution for a pupil size having a diameter of 6 mm.

Figure 6A:
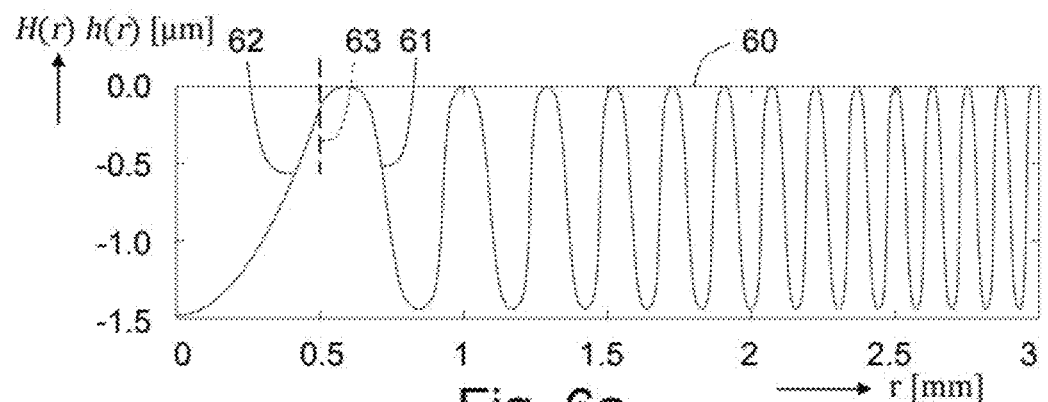

FIG. 6a shows an example amplitude profile or height profile of an embodiment of a trifocal ophthalmic lens schematically, graphically illustrate examples of height profiles, argument modulation parameters and argument modulation functions of monofocal central zones and diffraction gratings on a biconvex lens body for illustrating the present disclosure, and corresponding computer simulated light intensity distributions.

Figure 6B:
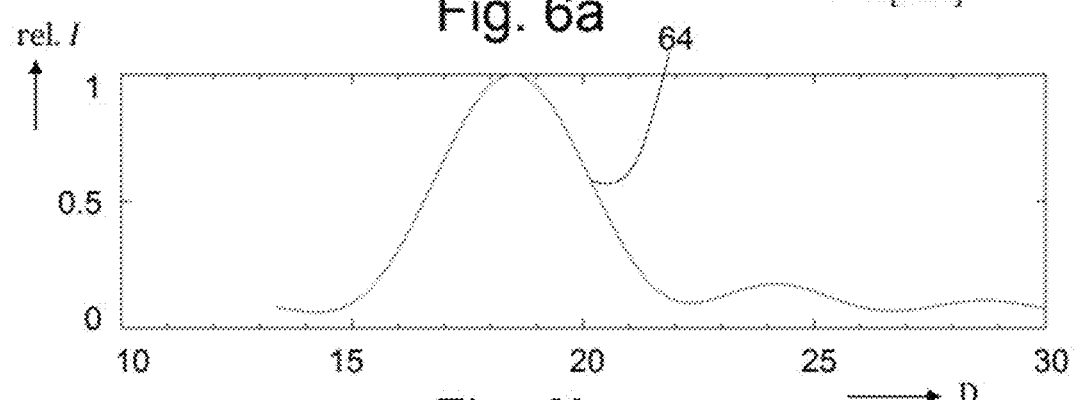

FIG. 6b shows example computer simulated light intensity distributions for the lens of FIG. 6a for a pupil size having a diameter of 1 mm.

Figure 6C:
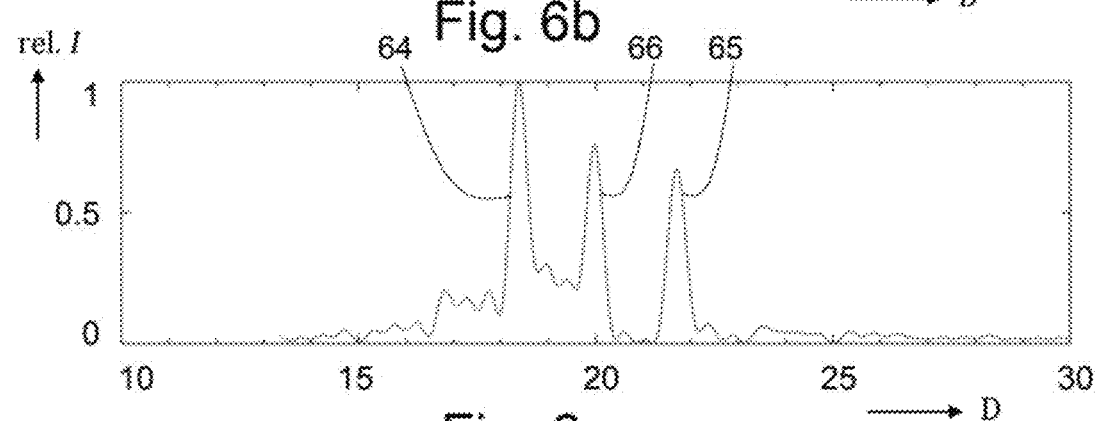

FIG. 6c shows example computer simulated light intensity distributions for the lens of FIG. 6a for a pupil size having a diameter of 3 mm.

Figure 6D:
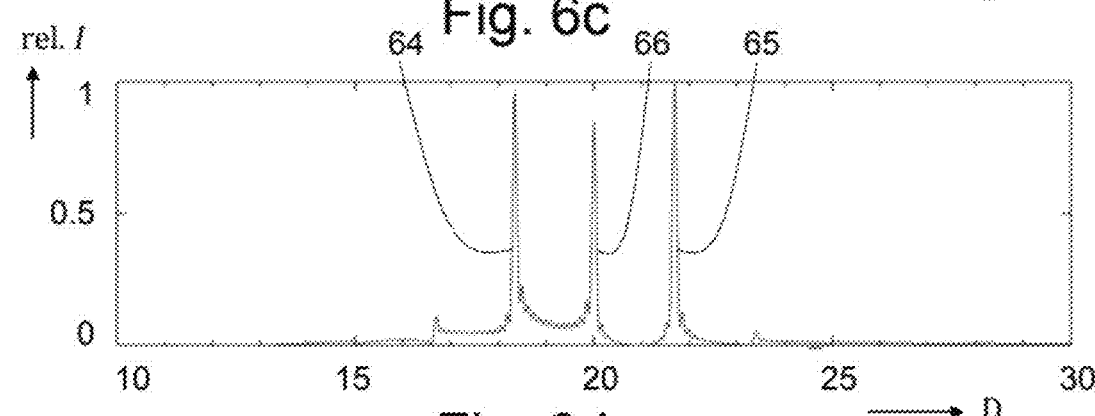

FIG. 6d shows example computer simulated light intensity distributions for the lens of FIG. 6a for a pupil size having a diameter of 6 mm.

Figure 7:
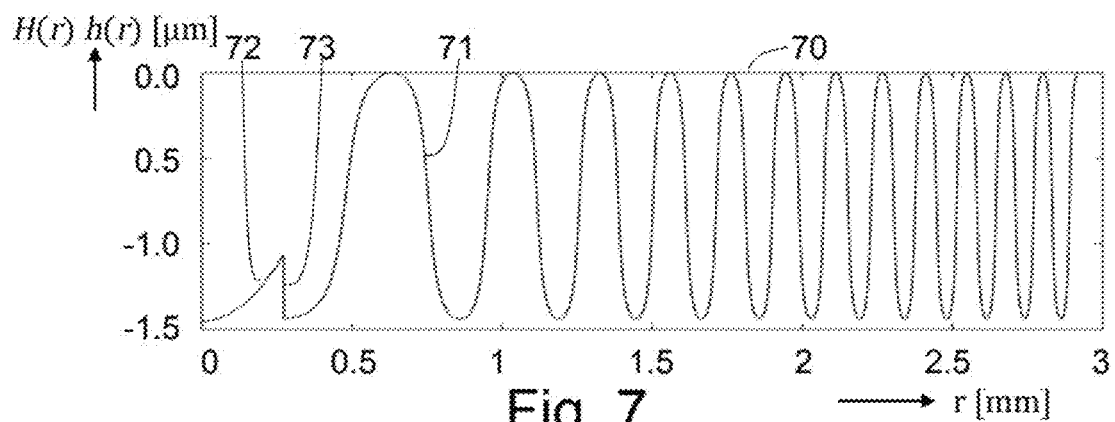

FIG. 7 shows an example of a continuous height or amplitude profile h(r) of a monofocal central zone, and a continuous periodic height or amplitude profile H(r) of a diffraction grating.

Figure 8:
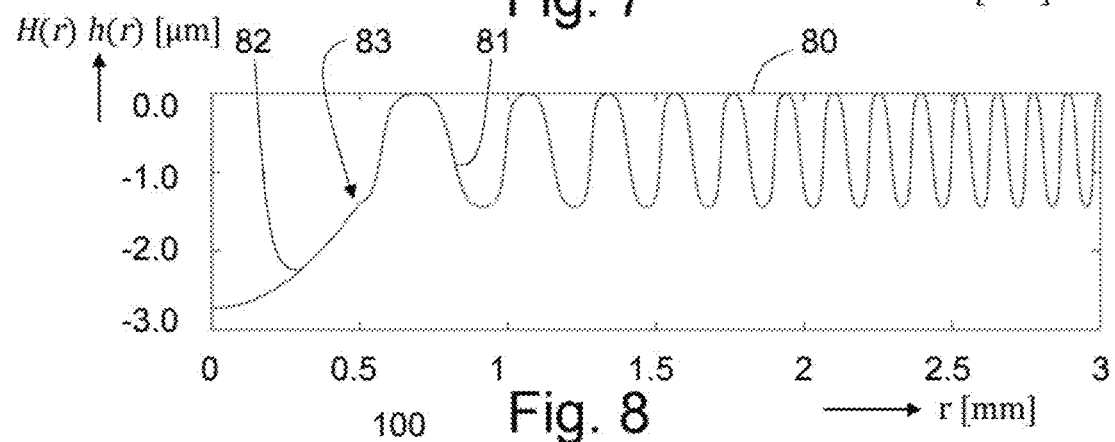

FIG. 8 illustrates an example in which the sharp edge in the height or amplitude profile of the optical system of the lens of the embodiment shown in FIG. 7 can be smoothened by increasing the dimensions of the monofocal central zone.

Figure 9A:
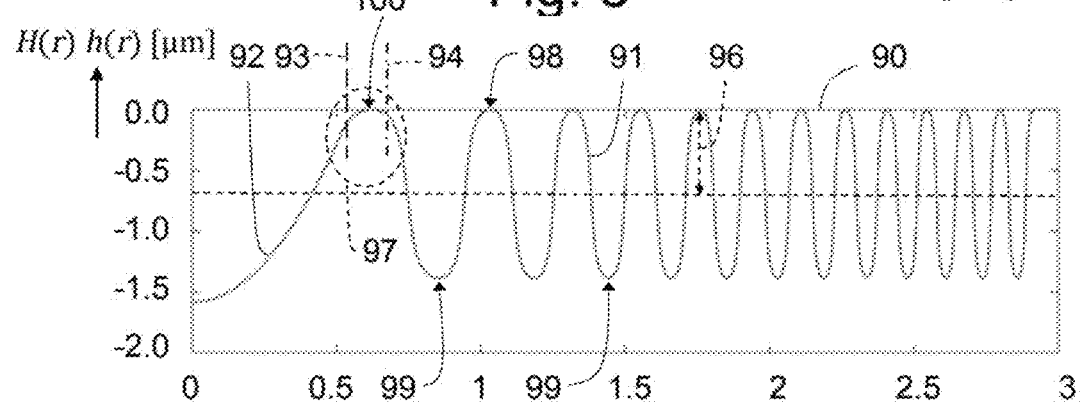

FIG. 9a illustrates an example of improved diffraction efficiency and a relative smooth transition in the height profiles from the central zone to the diffraction grating, when the transition point, at which the monofocal central zone ends and the diffraction grating starts, is located closer to a crest than a trough of the diffraction grating.

Figure 9B:
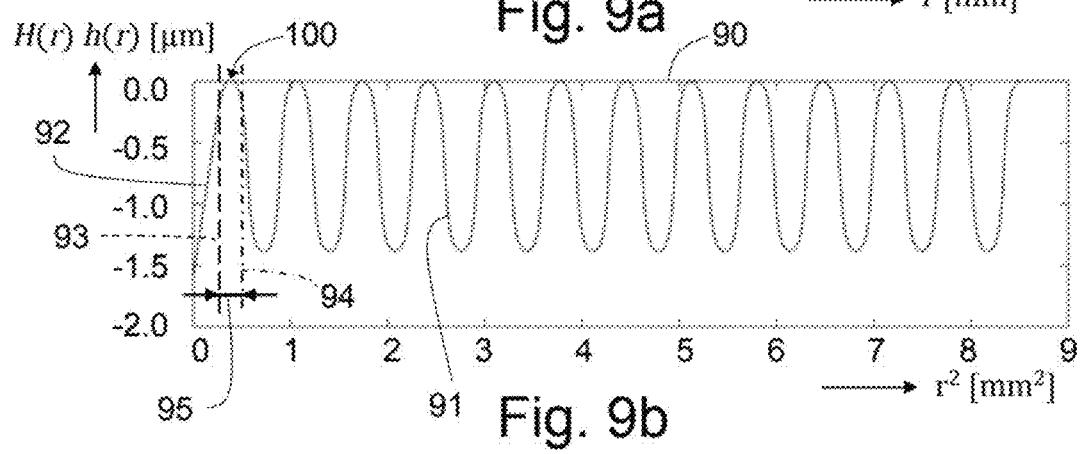

FIG. 9b shows examples of the height profiles of FIG. 9a in $r^2$ space.

Figure 10:
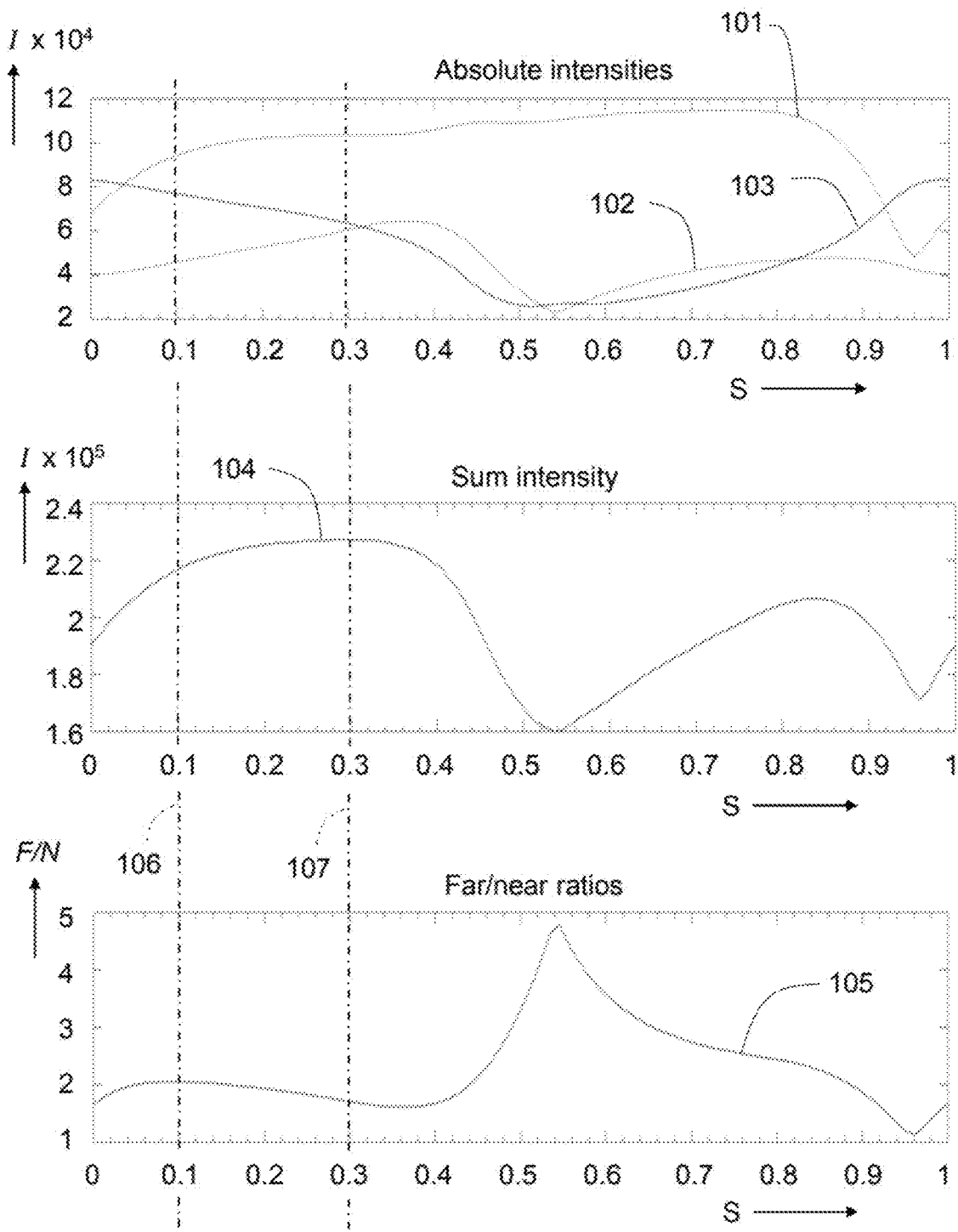
Figure 11:
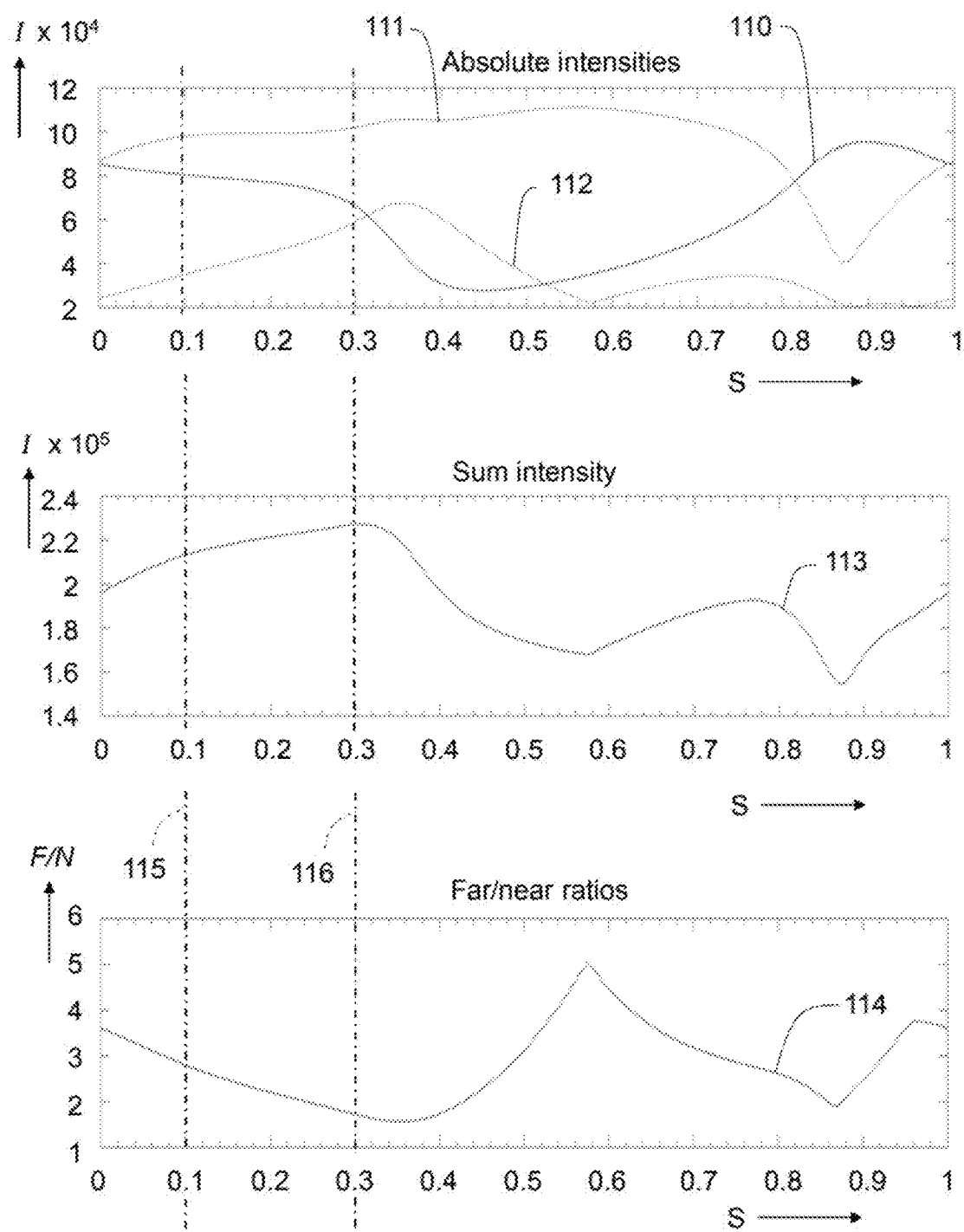

FIG. 10 illustrates, in a graphical manner, an example of computer simulations of ophthalmic lenses designed in accordance with the present disclosure, based on phase profiles for the diffraction grating and a far vision monofocal central zone FIG. 11 illustrates examples of computer simulated intensity profiles for different values of the parameter S of an ophthalmic lens, based on a pupil size or aperture size of 3 mm diameter.

Figure 12:
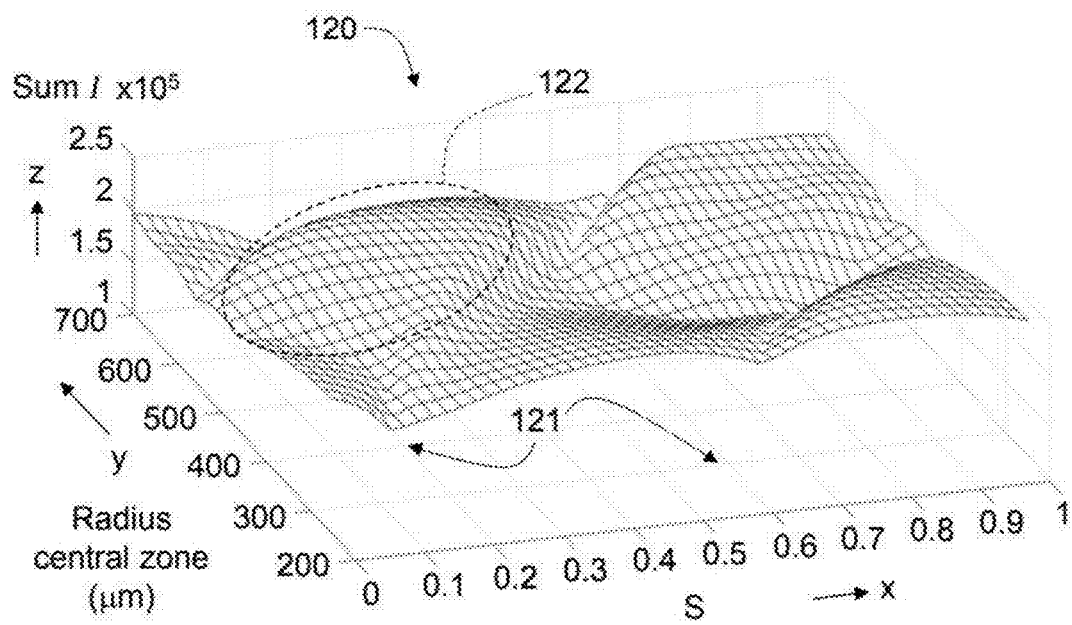

FIG. 12 shows an example of a three-dimensional graphical view based on ophthalmic lens designs in accordance with FIGS. 6a, 10 and 11.

Figure 13:
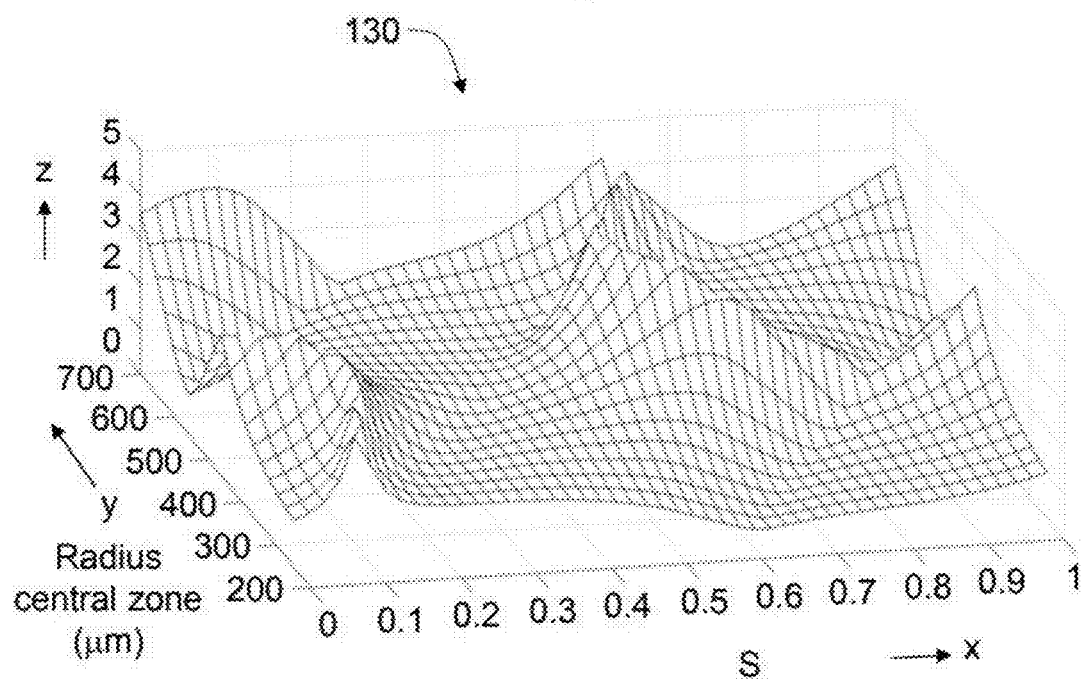

FIG. 13 illustrates an example of a three-dimensional graphical view, based on ophthalmic lens designs in accordance with FIGS. 10 and 11, the far/near ratio of the intensity of the light in the far and near focal points.

Figure 14:
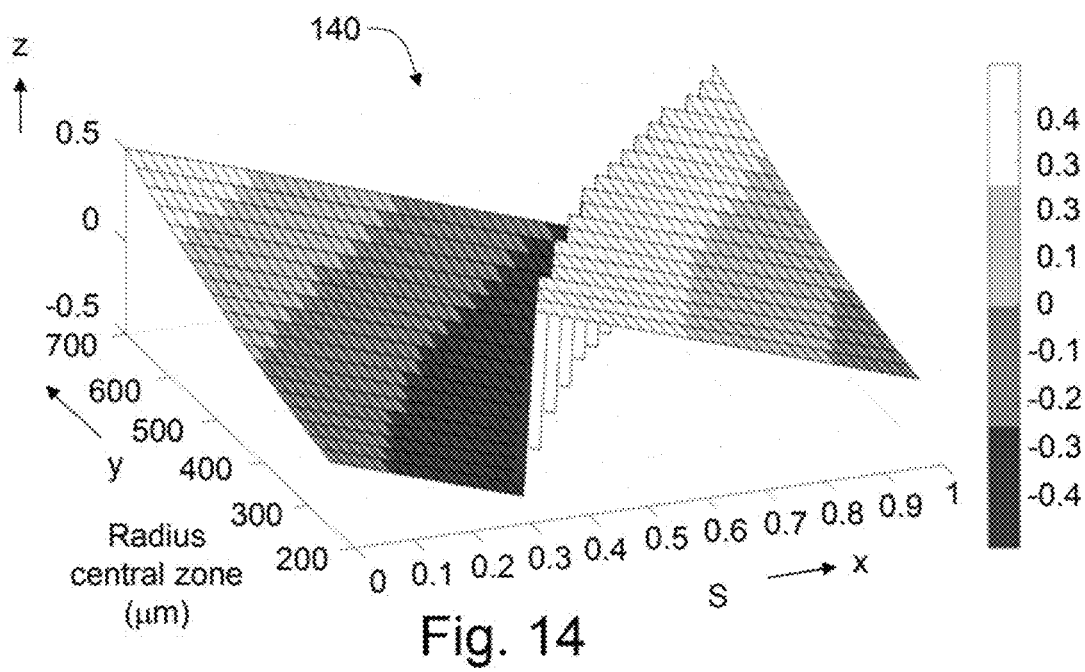

FIG. 14 shows an example of a three-dimensional graphical view, based on ophthalmic lens designs in accordance with FIGS. 10 and 11, along the dimensionless z-axis, the horizontal distance of a transition point to the crest amplitude, expressed in periods of the diffraction grating between the transition point and highest point.

Figure 15A:
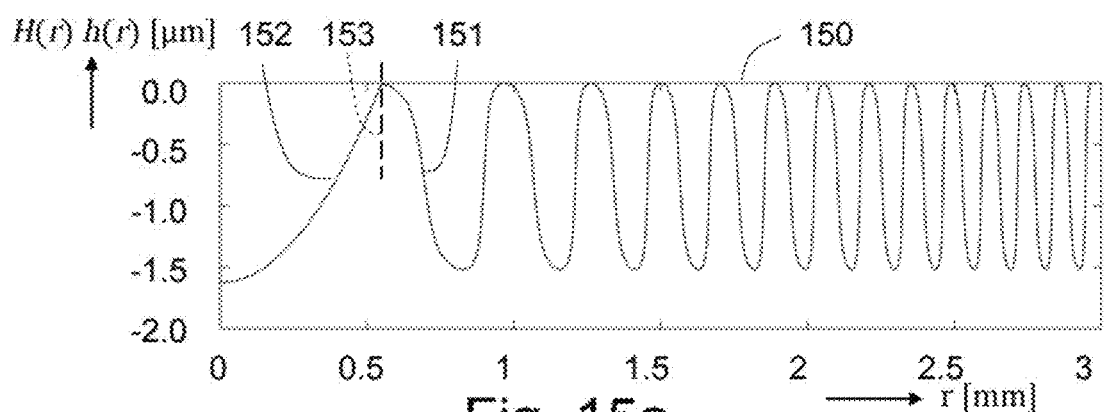

FIG. 15a illustrates an example height profile or amplitude profile of another embodiment of a trifocal ophthalmic lens.

Figure 15B:
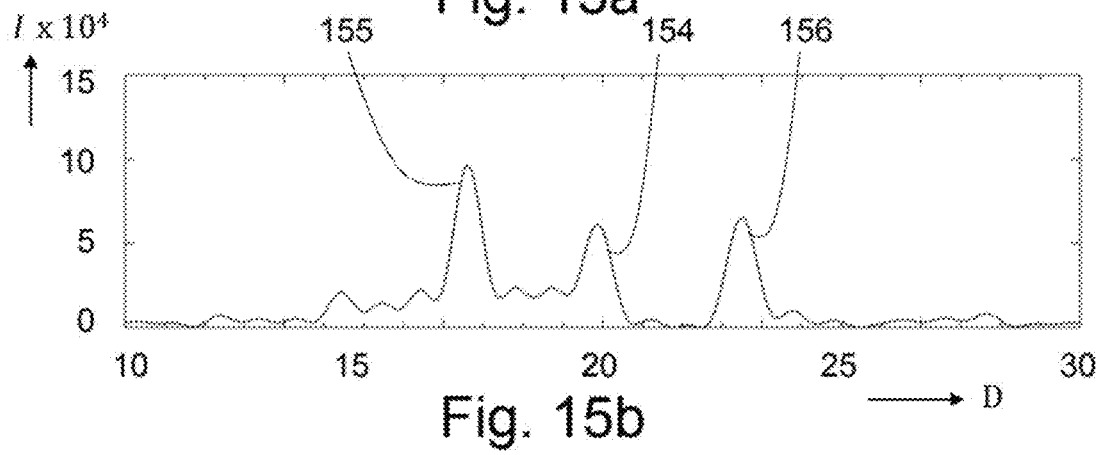

FIG. 15b shows example computer simulated light intensity distributions for the lens of FIG. 15a for a pupil size having a diameter of 3 mm.

Figure 16A:
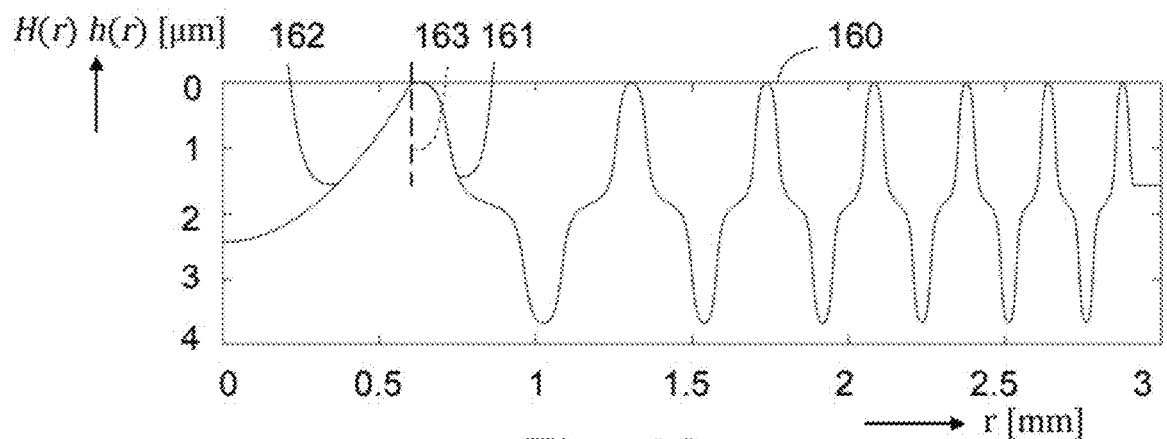

FIG. 16a illustrates, an example height profile or amplitude profile of a pentafocal lens.

Figure 16B:
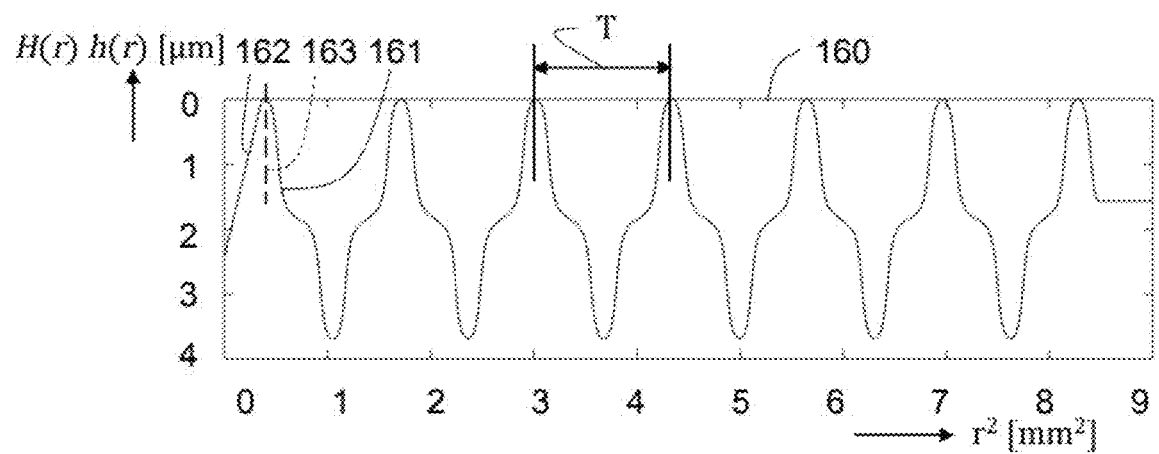

FIG. 16b illustrates the same height profile or amplitude profile of FIG. 16a, along a linear scale as function of the radial distance r, expressed in mm.

Figure 16C:
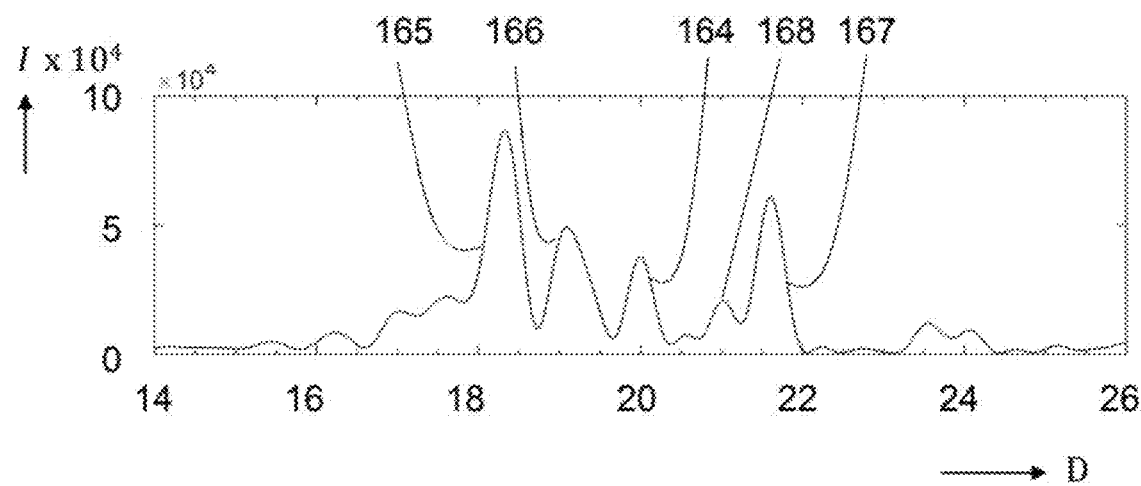

FIG. 16c illustrates an example intensity simulation diagram of an amount of light diffracted by a lens having a central zone profile and a diffraction profile according to FIGS. 16a and 16b.

Figure 17:
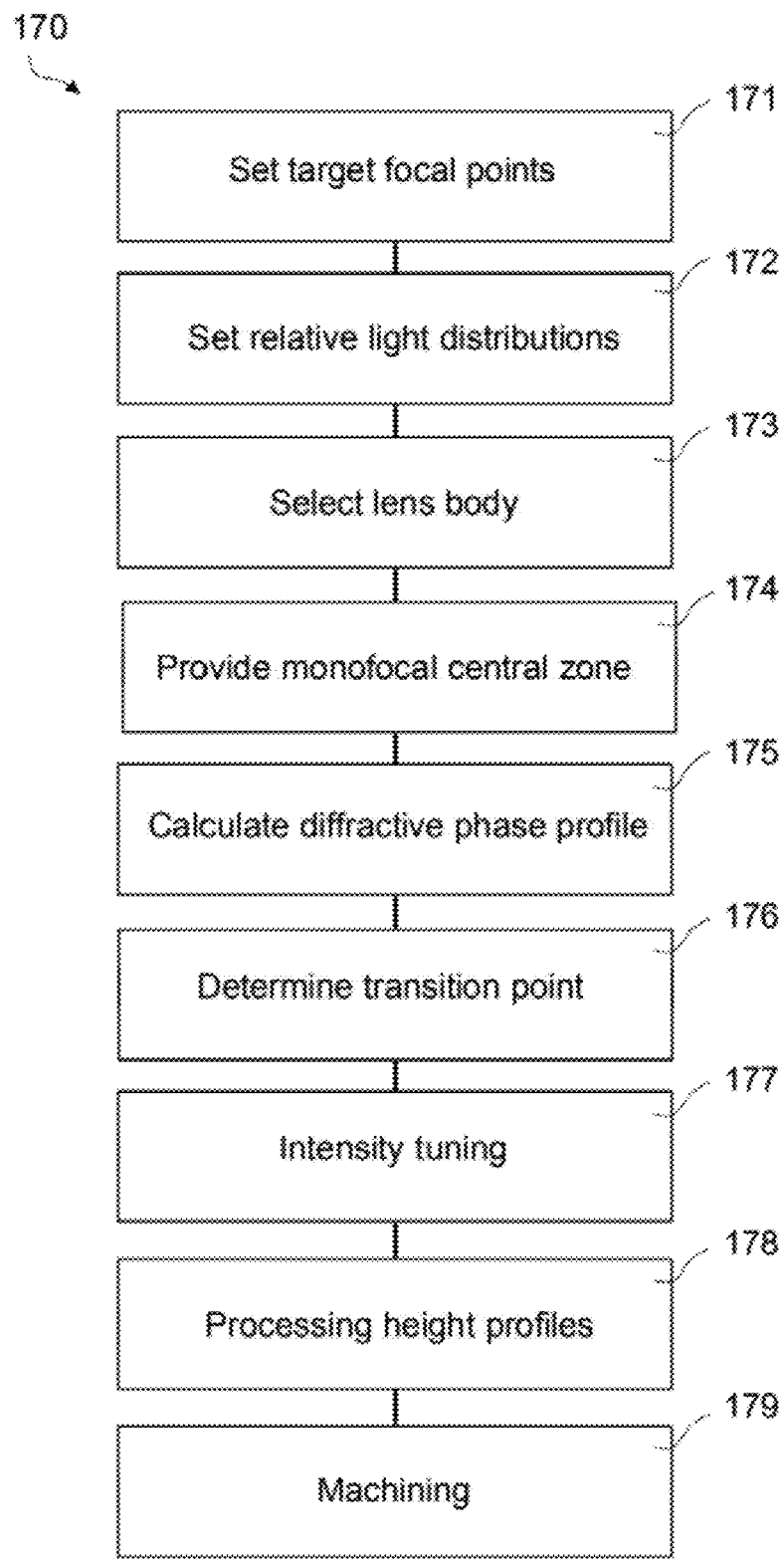

FIG. 17 illustrates, in a simplified flow diagram, steps of the method according to the present disclosure for manufacturing an ophthalmic multifocal lens.

DETAILED DESCRIPTION

FIG. 1 shows, in a simplified manner, the anatomy of the human eye 10, for the purpose of illustrating the present disclosure. The front part of the eye 10 is formed by the cornea 11, a spherical clear tissue that covers the pupil 12. The pupil 12 is the adaptable light receiving part of the eye 10 that controls the amount of light received in the eye 10. Light rays passing the pupil 12 are received at the natural crystalline lens 13, a small clear and flexible disk inside the eye 10, that focuses light rays onto the retina 14 at the rear part of the eye 10. The retina 14 serves the image forming by the eye 10. The posterior cavity 15, i.e. the space between the retina 14 and the lens 13, is filled with vitreous humour, a clear, jelly-like substance. The anterior and posterior chambers 16, i.e. the space between the lens 13 and the cornea 11, is filled with aqueous humour, a clear, watery liquid. Reference numeral 20 indicates the optical axis of the eye 10.

For a sharp and clear far field view by the eye 10, the lens 13 should be relatively flat, while for a sharp and clear near field view the lens 13 should be relatively curved. The curvature of the lens 13 is controlled by the ciliary muscles (not shown) that are in turn controlled from the human brain. A healthy eye 10 is able to accommodate, i.e. to control the lens 13, in a manner for providing a clear and sharp view of images at any distance in front of the cornea 11, between far field and near field.

Ophthalmic or artificial lenses are applied to correct vision by the eye 10 in combination with the lens 13, in which cases the ophthalmic lens is positioned in front of the cornea 11, or to replace the lens 13. In the latter case also indicated as aphakic ophthalmic lenses.

Multifocal ophthalmic lenses are used to enhance or correct vision by the eye 10 for various distances. In the case of trifocal ophthalmic lenses, for example, the ophthalmic lens is arranged for sharp and clear vision at three more or less discrete distances or focal points, generally called far, intermediate and near vision, in FIG. 1 indicated by reference numerals 17, 18 and 19, respectively. Light rays emanating from objects arranged at or near these distances or focal points 17, 18 and 19 are correctly focused at the retina 14, i.e. such that clear and sharp images of these objects are projected. The focal points 17, 18 and 19, in practice, may correspond to focal distances ranging from a few meters, to tens of centimeters, to centimeters, respectively. Usually doctors choose lenses for the patients so that the far focus allows the patient to focus on parallel light, in the common optical terminology it is that the far is focused on infinity.

The amount of correction that an ophthalmic lens provides is called the optical power, OP, and is expressed in Diopter, D. The optical power OP is calculated as the inverse of a focal distance f measured in meters. That is, OP=1/f, wherein f is a respective focal distance from the lens to a respective focal point for far 17, intermediate 18 or near vision 19. The optical power of a cascade of lenses is found by adding the optical powers of the constituting lenses, for example. The optical power of a healthy human lens 13 is about 20 D.

FIG. 2a shows a top view of a typical ophthalmic multifocal aphakic intraocular lens 30, and FIG. 2b shows a side view of the lens 30. The lens 30 comprises a light transmissive circular disk-shaped lens body 31 and a pair of haptics 32, that extend outwardly from the lens body 31, for supporting the lens 30 in the human eye. The lens body 31 has a biconvex shape, comprising a center part 33, a front or anterior surface 34 and a rear or posterior surface 35. The lens body 31 further comprises an optical axis 29 extending transverse to front and rear surfaces 34, 35 and through the center of the center part 33. Those skilled in the art will appreciate that the optical axis 29 is a virtual axis, for the purpose of referring the optical properties of the lens 30. The convex lens body 31, in a practical embodiment, provides a refractive optical power of about 20 D.

In the embodiment shown, at the front surface 34 of the lens body 31 a periodic light transmissive diffraction grating or relief 36 is arranged, comprised of rings or zones extending concentrically with respect to the optical axis 29 through the center part 33 over at least part of the front surface 34 of the lens body 31. The diffraction grating or relief 36 provides a set of diffractive focal points. Although not shown, the diffraction grating or relief 36 may also be arranged at the rear surface 35 of the lens body 31, or at both surfaces 34, 35. In practice, the diffraction grating 36 is not limited to concentric circular or annular ring-shaped zones, but includes concentric elliptic or oval shaped zones, for example, or more in general any type of concentric rotational zone shapes.

In practice the optic diameter 37 of the lens body 31 is about 5-7 mm, while the total outer diameter 38 of the lens 30 including the haptics 31 is about 12-14 mm. The lens 30 may have a center thickness 39 of about 1 mm. In the case of ophthalmic multifocal contact lenses and spectacle or eye glass lenses, the haptics 32 at the lens body 31 are not provided, while the lens body 31 may have a plano-convex, a biconcave or plano-concave shape, or combinations of convex and concave shapes. The lens body may comprise any of Hydrophobic Acrylic, Hydrophilic Acrylic, Silicone materials, or any other suitable light transmissive material for use in the human eye in case of an aphakic ophthalmic lens.

Figure 3:
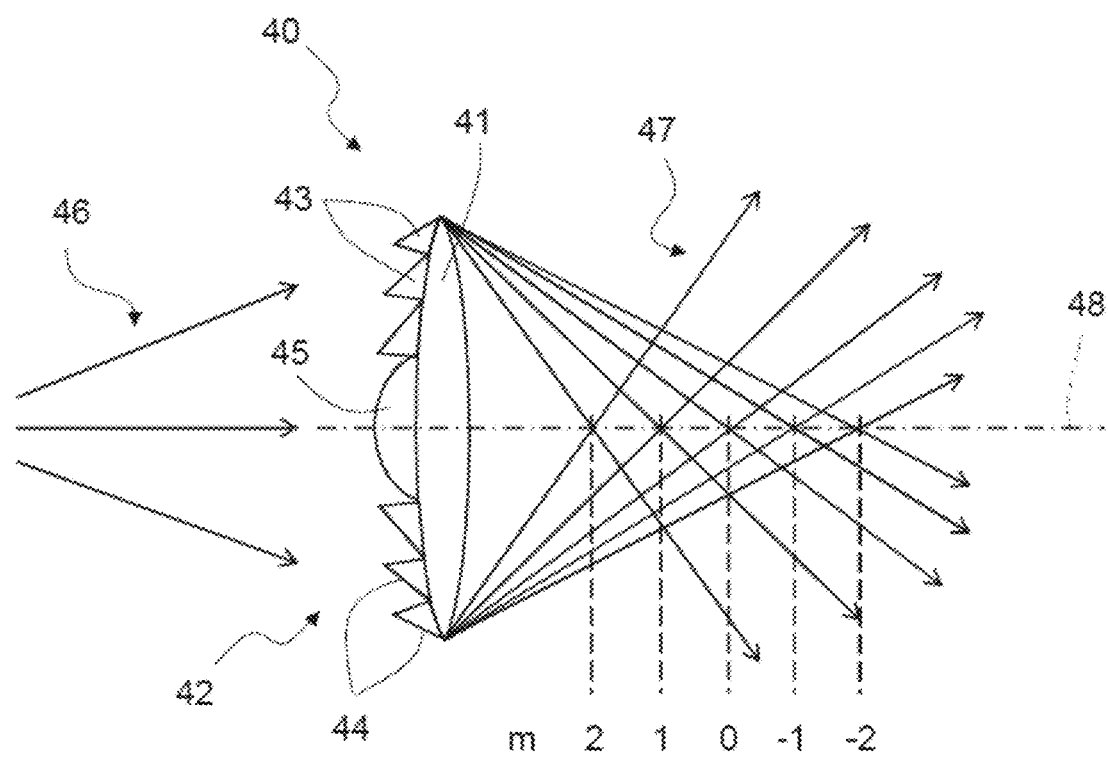
FIG. 3 illustrates, in a schematic manner, in a cross-sectional view, the optical operation of a prior art diffractive lens comprising a biconvex light transmissive body and a jagged or saw-tooth type light transmissive diffraction grating.

FIG. 3 schematically illustrates, the optical operation of a known periodic light transmissive diffraction grating or relief 42 of a lens 40 comprising a biconvex light transmissive circular disk-shaped lens body 41. The lens 40 is shown in a cross-sectional view in radial direction of the lens body. The diffraction grating or relief 42 comprises a plurality of repetitive, contiguously arranged, prism shaped transparent diffractive optical elements, DOEs, 43. The DOEs 43 extend in concentric zones around the center part 45 of the lens body 41, in a manner similar to the rings or zones of the grating or relief 36 shown in FIG. 2a. For illustrative purposes, the DOEs 43 of the diffraction grating 42 are shown as well-known jagged or saw-tooth type elements, comprising a continuous, sloping light receiving surface 44, such as a linear or curved sloping light receiving surface 44. Gratings or reliefs in which the DOEs 43 are spaced apart in radial direction of the lens body 41, are called binary type reliefs (not shown). The repetition period or pitch of the DOEs 43 monotonically decreases in radial direction from the center or optical axis of the lens and various with the square of the radial distance.

An incident or primary light beam 46 that passes the grating 42 and the lens body 41 is, respectively, diffracted and refracted and results in an output or secondary light beam 47. The refracted and diffracted light waves 47 form a plurality of focal points at the optical axis 48 of the lens 40, due to constructive interference of the light waves 47. Constructive interference occurs when the optical path difference between light waves 47 arriving from the lens body 41, at a particular focal point, is an integer multiple of their wavelength, i.e. the light waves are in-phase, such that their amplitudes add-up in a reinforcing manner. When the difference in optical path length travelled by interfering light waves 47 from the lens body 41 is an odd multiple of half of the wavelength, such that a crest of one wave meets a trough of another wave, the light waves 47 partly or completely extinguish each other, i.e. the light waves are out of phase, not resulting in focal points at the optical axis 48 of the lens body 41.

The points of constructive interference at various distances from the lens body 41 are generally designated diffraction orders. The focal point that corresponds to the focal point that originates due to refractive operation of the curvature of the lens 40 is indicated by order zero, 0. The other focal points are designated by orders +m and −m, wherein m is a positive integer value. That is, m=+1, +2, +3, etc. if the respective focal point occurs at the left-hand side of the zero order when viewed in the plane of the drawing, i.e. at a distance in the direction towards the lens body 41, and designated by orders m=−1, −2, −3, etc. if the respective focal point occurs at the right-hand side of the zero order when viewed in the plane of the drawing, i.e. at a distance in the direction away from the lens body 41. Such as illustrated in FIG. 3.

It is noted that the above allocation of the positive and negative diffraction orders in some publications and handbooks may be reversed with respect to their position relative to the zero order. This, for example, becomes the case when the theory in the publication by Romero et al is applied directly as has been done here. If not otherwise indicated, the present description adheres to the convention as shown in FIG. 3.

The diffraction relief 42 can be designed to provide focal points at different distances from the lens body 41. The periodic spacing or pitch of the DOEs 43 substantially determines where the points of destructive and constructive interference occur at the optical axis 48 of the lens, i.e. the position of the diffractive orders at the optical axis 48. By the shape and height of the DOEs 43 the amount of incident light that is provided at a point of constructive interference, i.e. at or in a particular diffraction order, is controlled.

In case of a diffraction grating or relief 42 providing diffraction orders that are regularly spaced at both sides of the zero order, the grating or relief is called a symmetric wave splitter, as the incident light beam 45 is symmetrically diffracted or split with respect to the zero order. A grating or relief producing a non-regular spacing of diffractive orders, such as +1, +2, −3, −5 is called an asymmetric beam splitter.

The light energy in light waves 47 that are focused or diffracted in focal points or orders that do not contribute to image forming at the retina 14 of the human eye 10 is lost and reduces the overall efficiency of the lens 40, and hence the quality of images perceived by a human being using such lens. In practice, for optimally designing a lens, it is advantageous if the focal points for providing or correcting far, intermediate and near vision to the human eye, such as illustrated in FIG. 1, for example, can be set beforehand, and a diffraction grating 42 is provided that maximizes the overall efficiency of the light energy received from the incident light beam 46 in these pre-set focal points is optimal.

In scientific literature, a diffraction grating optimizing overall efficiency of the light distribution in pre-set or target diffraction orders is found from determining a linear phase-only function or phase profile that generates the target diffraction orders with a maximum overall efficiency η or figure of merit defined as the sum of the normalized light energies of all these target orders. These diffractive gratings can then be shaped into lenses by adjusting the argument so that they have equidistant periods in the $r^2$ space.

Those skilled in the art will appreciate that the lens body 41 may comprise a plano-convex, a biconcave or plano-concave shape, and combinations of convex and concave shapes or curvatures (not shown).

Reference numeral 50 in FIG. 4a shows an example of height profile or amplitude profile H(r) of a continuous periodic diffraction profile in $r^2$ space, expressed in mm$^2$, as disclosed by WO2019020435, and FIG. 4b shows the same height function along a linear scale as function of the radial distance r, based on the phase profile function φ(r) according to equation (5), i.e.:

$$H(r) = A(r)\frac{\lambda}{2\pi(n - n_m)} * \tan^{-1}\left[\alpha(r)\sin\left(\frac{2\pi(r^2 - S(r))}{T}\right)\right] \quad (11)$$

wherein: H(r) height profile of the lens, [nm],
A(r) is an amplitude modulation function of the phase profile function in radial direction of the lens body,
λ is the design wavelength of the lens, [nm],
n is the index of refraction of the lens body,
$n_m$ is the index of refraction of the medium surrounding the lens body.

The amplitude of the height profile H(r) is depicted at µm scale along the vertical axis. The optical axis, running through the center of the lens body, is assumed to be at a radial position r=0, whereas the radial distance r measured in outward direction from the optical axis is expressed in mm along the vertical axis.

In this embodiment, the design wavelength A of the lens is assumed at 550 nm, the index of refraction n of the lens body is set to 1.4618, and the index of refraction $n_m$ of the medium surrounding the lens body is assumed to be 1.336. The amplitude modulation function A(r) is a constant at 1.07, the argument magnitude modulation function a(r) is a constant at α=2.65718, the period T=0.733 mm$^2$ in $r^2$ space, and the argument angle modulation function S(r)=0, i.e. no phase shift or argument angle modulation. Reference numeral 50 refers to the outer circumference or baseline curvature of the front surface 34 of the lens body 30 having a diffraction grating or relief 36 comprising the diffraction profile function H(r) 51. See FIGS. 2a and 2b.

As can be viewed from FIG. 4a, in $r^2$ space each period T of the height profile H(r) 51 is depicted with an equal or equidistant length. The height profile or height function H(r) 51 is a single, closed-form continuous geometric function defining concentrically arranged DOEs, starting from the optical axis, i.e. r=0 and extending in outward direction from the optical axis over the lens body. The diffraction profile has no sharp transitions which are difficult to manufacture in the lens body. Accordingly, the height profile H(r) 51 of the diffraction grating allows for accurate manufacturing of the lens.

The amount of light diffracted by the lens having the height profile H(r) 51 is shown by computer simulated light intensity distributions in FIG. 4c. Reference numeral 54 refers to diffraction order 0, providing a focal point for intermediate vision, reference numeral 52 refers to diffraction order −1, providing a focal point for far vision, and reference numeral 53 refers to the +1 diffraction order, providing a focal point for near vision. In the intensity profiles, the intensity I of the diffracted light is depicted in arbitrary units along the vertical axis as a function of the optical power in diopter, D, depicted along the horizontal axis.

The computer simulated light intensity distributions assume a biconvex lens body 31 of an ophthalmic lens 30 of the type shown in FIGS. 2a, 2b, designed for targeting a zero order focal point at 20 diopter, D, and first order focal points at 21.5 D and 18.5 D, symmetrically positioned with respect to the zero order. That is, providing a focal point for intermediate vision at 20 D for the zeroth order focal point, providing a focal point for far vision at 18.5 D by diffraction order −1, and providing a focal point for near vision at 21.5 D by the +1 diffraction order. Those skilled in the art will appreciate that these optical powers or focal points may differ for actual lenses, dependent on the target focal points. The examples are calculated using MATLAB™ based simulation software, and assuming a pupil size of 6 mm diameter.

As can be seen from FIG. 4c, different from the lens phase profile calculated for the linear optimal triplicator by Gori et al., for a(r)=2.65718 the amount of light incident at the curved lens body is not distributed equally in the target focal points. This, because the optimum triplicator periodic phase profile function by Gori et al. is calculated for a linear or planar phase grating for which the distances between the periods show a linear dependency, while by transforming same into a lens, the distances between the periods of the phase profile function comprise a square root dependency.

FIG. 5a shows a height profile or height function H(r) 56 according to equation (11) above, as a function of the radial distance r of a diffraction grating in an embodiment of a trifocal intraocular ophthalmic lens. The design wavelength λ, the index of refraction n of the lens body, the index of refraction nm of the medium surrounding the lens body, the amplitude modulation function A(r), the argument magnitude modulation function a(r), and the period T in $r^2$ space, for this embodiment, are identical to the parameters of the embodiment illustrated by FIGS. 4a-4c. Different from the embodiment of FIGS. 4a-4c, the argument angle of the height profile H(r) 56 of the diffraction grating illustrated in FIG. 5a is modulated by a modulation function S(r) having a fixed value S=0.42*T. Reference numeral 55 refers to the outer circumference or baseline curvature of the front surface 34 of the lens body 30 having a diffraction grating or relief 36, extending from the optical axis, comprising the diffraction profile function H(r) 56.

The height profile or height function H(r) 56 is a single, closed-form continuous geometric function defining concentrically arranged DOEs, starting from the optical axis, i.e. r=0 and extending in outward direction from the optical axis over the lens body.

FIGS. 5b, 5c and 5d show computer simulated light intensity distributions for the lens of FIG. 5a for varies pupil sizes. Along the vertical axis of the graphs in FIGS. 5b, 5c and 5d, the relative intensity rel. I of the refracted and diffracted light with respect to the maximum intensity in one of the focal point is depicted as a function of the optical power in diopter, D, depicted along the horizontal axis. The examples are again calculated using MATLAB™ based simulation software.

The computer simulated light intensity distributions assume a biconvex lens body designed for targeting a zero order focal point at 20 diopter, D, and first order focal points at 21.5 D and 18.5 D, symmetrically positioned with respect to the zero order. That is, providing a focal point for intermediate vision at 20 D for the zeroth order focal point, providing a focal point for far vision at 18.5 D by diffraction order −1, and providing a focal point for near vision at 21.5 D by the +1 diffraction order. FIG. 5b shows the light intensity distribution 57 for a pupil size having a diameter of 1 mm. As can be seen from FIG. 5b, almost all the light incident on the lens is concentrated in the focal for intermediate vision at 20 D. That is, when measuring the optical system of a user comprising intraocular lenses according to the embodiment of FIG. 5a using an autorefractometer and a light intensity such that the pupil size of the user is about 1 mm in diameter, the focal point actually measured with the autorefractometer is not one of the diffractive focal points but the intermediate or refractive focal point.

FIG. 5c shows the light intensity distribution for a pupil size having a diameter of 3 mm. A pupil of such size covers a larger part of the diffractive profile and of the convex surface of the lens as for the 1 mm pupil size shown in FIG. 5b. Reference numeral 57 again refers to diffraction order 0, providing the focal point for intermediate vision. Reference numeral 58 refers to the −1 diffraction order, providing a focal point for far vision, and reference numeral 59 refers to the +1 diffraction order, providing a focal point for near vision. As can be seen from the intensity profile of FIG. 5b, a greater part of the incident light is distributed in the focal point for near vision 59, compared to the amount of light distributed in the focal points for intermediate 57 and far vision 64.

FIG. 5d shows the light intensity distribution for a pupil size having a diameter of 6 mm. A pupil of such size generally covers the whole optical system of an ophthalmic lens. Reference numeral 57 again refers to diffraction order 0, providing the focal point for intermediate vision, reference numeral 58 refers to diffraction order −1, providing the focal point for far vision, and reference numeral 59 refers to the +1 diffraction order, providing the focal point for near vision.

FIG. 6a shows an amplitude profile or height profile of an embodiment of a trifocal ophthalmic lens in accordance with the present disclosure, comprising a central zone, i.e. the central part 33 of the lens 31 shown in FIG. 2a, having a continuous amplitude profile h(r), indicated by reference numeral 62, and a diffraction profile 61 having an amplitude function H(r) extending in radial distance of the lens body across its surface 60, providing diffractive focal points for far and near vision.

The amplitude of the height profiles h(r) and H(r) is depicted at µm scale along the vertical axis of FIG. 6a. The optical axis, running through the center of the lens body, is assumed to be at a radial position r=0, whereas the radial distance r measured in outward direction from the optical axis is expressed in mm along the vertical axis.

The central zone extends over a distance in radial direction r from the optical axis, across part of the surface 60 of the lens body, and its continuous amplitude profile h(r) 62 is designed to provide a single focal point coinciding with one of the diffractive focal points of the diffraction profile 61, hence providing a monofocal central zone.

In FIG. 6a, reference numeral 60 refers to the outer circumference or baseline curvature of the front surface 34 of the lens body 30, as illustrated in FIGS. 2a and 2b. At a transition point 63, at a radial position of the lens body at a distance from the optical axis, the continuous amplitude profile h(r) of the monofocal central zone ends and continuous in the amplitude profile H(r) 61.

In the embodiment of FIG. 6a, the monofocal central zone 62 comprises a phase profile function φ(r) in accordance with equation (2) above, i.e.:

$$\varphi(r) = -\pi \frac{r^2}{\lambda f} \tag{2}$$

f is the focal point of the central zone. It is not identical to the focal point of the lens as a whole. In a typical example the intermediate focal point of an IOL might be 20 D and the Far and Near focal points being placed at 18.5 D and 21.5 D, respectively. The absolute value of f is then (1/1.5) m=0.67 m.

To get to the actual physical shape or amplitude profile on the lens the following steps are applied.

Assume that the monofocal central zone 62 should contribute to the focal point for far vision, that is the focal point of the monofocal central zone 62 should coincide with the focal point for far vision provided by the diffraction grating 61. The base power of the lens, i.e. the refractive power, contributes to the intermediate vision provided by a convex lens body, such as the convex lens body 31 shown in FIG. 2b.

Adding a far vision zone onto the lens requires the provision of a negative lens part. To achieve this the sign of equation (2) is changed, i.e.:

$$\varphi(r) = \pi \frac{r^2}{\lambda f} \quad (12)$$

To then transform the expression to a distance, the shape of the monofocal zone is expressed in terms of wavelengths, i.e. $\varphi(r)/2\pi$. Next the refractive index of the lens and the surrounding medium have to be established to find the distance that corresponds to a full, i.e. $2\pi$ phase shift. This can be written as $\lambda/(n-n_m)$ where $\lambda$ is the design wavelength of the lens, [nm], n is the index of refraction of the lens body, and $n_m$ is the index of refraction of the medium surrounding the lens body. Multiplication with the lens profile expressed in wavelengths, one arrives at the amplitude profile or height profile h(r) of the monofocal central zone 62, i.e.:

$$h(r) = \frac{r^2}{2f(n-n_m)} \quad (13)$$

Note that the design wavelength 1 is disappeared from equation (13).

If a spherical monofocal central zone is chosen, the radius of curvature may be obtained using the well-known Lensmaker's formula. Assuming that the thin lens approximation may be applied, this results in:

$$\frac{1}{f} = \frac{(n-n_m)}{R} \rightarrow R = f(n-n_m) \quad (14)$$

wherein: R represents the radius of the curvature of the monofocal central zone, [m].

Using the knowledge that a concave central zone is to be provided, from equations (13) and (14) the amplitude profile of the monofocal central zone can be calculated as:

$$h(r) = -\sqrt{R^2 - r^2}$$

In the embodiment of FIG. 6a, the amplitude profile of the diffraction grating 61 corresponds to the amplitude profile of the diffraction grating (11) disclosed above with reference to FIG. 4a, i.e.:

$$H(r) = A(r)\frac{\lambda}{2\pi(n-n_m)} * \tan^{-1}\left[\alpha(r)\sin\left(\frac{2\pi\{r^2-S(r)\}}{T}\right)\right] \quad (11)$$

In accordance with the present disclosure, at the transition point 63, the amplitude profiles of the diffraction grating 61 and the monofocal central zone 62 have coinciding amplitude values. That is, at the transition point 63, the amplitude values of both amplitude profiles are equal or essentially equal, such that at the transition point a jump in the amplitude or height of the overall optical profile of the lens transverse to the surface 60 of the lens body, leading to non-uniformities in the path that incident light travels through the lens, is effectively avoided.

In this embodiment, the design wavelength A of the lens is assumed at 550 nm, the index of refraction n of the lens body is set to 1.492, and the index of refraction $n_m$ of the medium surrounding the lens body is assumed to be 1.336.

The amplitude modulation function A(r) is a constant at 1.06, the argument magnitude modulation function a(r) is a constant, $\alpha=2.65718$, the period $T=0.66$ mm² in r² space, and the argument angle modulation function S(r) represents a constant phase shift S=0.31*T.

FIGS. 6b, 6c and 6d show computer simulated light intensity distributions for the lens of FIG. 6a for varies pupil sizes as in FIGS. 5b, 5c and 5d, respectively. Along the vertical axis of the graphs in FIGS. 6b, 6c and 6d, the relative intensity rel. I of the refracted and diffracted light with respect to the maximum intensity in one of the focal points is depicted as a function of the optical power in diopter, D, depicted along the horizontal axis. The examples are again calculated using MATLAB™ based simulation software.

The computer simulated light intensity distributions assume a biconvex lens body designed for targeting a zero order focal point at 20 diopter, D, and first order focal points at 21.675 D and 18.325 D, symmetrically positioned with respect to the zero order. That is, providing a focal point for intermediate vision at 20 D for the zeroth order focal point, providing a focal point for far vision at 18.325 D by diffraction order −1, and providing a focal point for near vision at 21.675 D by the +1 diffraction order.

FIG. 6b shows the light intensity 64 for a pupil size having a diameter of 1 mm. As can be seen from FIG. 6b, almost all the light incident on the lens is concentrated in the focal for far vision at 18.5 D. This complies to the design objective of the lens of the present embodiment according to the present disclosure, i.e. providing a monofocal central zone coinciding with the target focal point for far vision of the diffraction grating. As can be seen from the amplitude profiles of FIG. 6a, the radius of the monofocal central zone 62 ends at a distance of about 0.5 mm, such that a pupil size of 1 mm diameter almost exclusively covers the monofocal central zone. FIG. 6c shows the light intensity for a pupil size having a diameter of 3 mm. A pupil of such size covers the monofocal central zone and part of the diffractive profile and the convex surface of the lens. Reference numeral 66 refers to diffraction order 0, providing a focal point for intermediate vision. Reference numeral 65 refers to the +1 diffraction order, providing a focal point for near vision. As can be seen from the intensity profile of FIG. 6c, most of the incident light is distributed in the focal point for far vision 64.

FIG. 6d shows the light intensity for a pupil size having a diameter of 6 mm. A pupil of such size generally covers the whole optical system of an ophthalmic lens. Reference numeral 66 refers to diffraction order 0, providing the focal point for intermediate vision, reference numeral 64 refers to diffraction order −1, providing the focal point for far vision and reference numeral 65 refers to the +1 diffraction order, providing the focal point for near vision. As can be seen from the intensity profile of FIG. 6d, the amount of light distributed in each of the focal points 64, 65, 66 is nearly equal. Accordingly, the additional contribution of light distributed in the focal point for far vision as a result of the monofocal central zone according to the present disclosure, can be compensated by a proper design of the diffraction profile, such to provide multifocal properties for pupil sizes larger than the monofocal central zone.

FIG. 7 shows an example of a continuous height or amplitude profile h(r) 72 of a monofocal central zone, and a continuous periodic height or amplitude profile H(r) of a diffraction grating 71, in accordance with the phase profiles of equations (11) and (15) above, extending across a lens surface 70.

In this embodiment, the design wavelength λ of the lens is assumed at 550 nm, the index of refraction n of the lens body is set to 1.492, and the index of refraction $n_m$ of the medium surrounding the lens body is assumed to be 1.336. The amplitude modulation function A(r) is a constant at 1.06, the argument magnitude modulation function a(r) is a constant, α=2.65718, the period T=0.67 mm$^2$ in r$^2$ space, and the argument angle modulation function S(r) represents a constant phase shift S=0.34*T.

The computer simulated light intensity distributions assume a biconvex lens body designed for targeting a zero order focal point at 20 diopter, D, and first order focal points at 21.675 D and 18.325 D, symmetrically positioned with respect to the zero order. At the transition point 73, where the monofocal central zone ends, that is at a radial distance of about 0.3 mm from the optical axis, the amplitudes of the amplitude profiles 71 and 72 are not equal or substantially equal in accordance with the present disclosure, such that a relative sharp edge occurs in the optical system of the lens, at the transition point 72.

FIG. 8 illustrates that the sharp edge in the height or amplitude profile of the optical system of the lens of the embodiment shown in FIG. 7 can be smoothened by increasing the dimensions of the monofocal central zone, and having the monofocal central zone ending at a transition point 83 where the amplitude value h(r) of the monofocal central zone 82 equals the amplitude value H(r) of the diffraction grating 81. In this example, the monofocal central zone ends at a radial distance of about 0.5 mm from the optical axis.

The continuous height or amplitude profile h(r) 82 of the monofocal central zone and the continuous periodic height or amplitude profile H(r) of a diffraction grating 81, are also in accordance with the phase profiles according to equations (15) and (11) above, extending across a lens surface 80.

It has been observed that by positioning the transition point 83 closer to a trough 85 than a crest 84 of the diffraction grating 81, the diffraction efficiency of the lens is not optimal.

In this embodiment, the design wavelength λ of the lens is assumed at 550 nm, the index of refraction n of the lens body is set to 1.492, and the index of refraction $n_m$ of the medium surrounding the lens body is assumed to be 1.336. The amplitude modulation function A(r) is a constant at 1.06, the argument magnitude modulation function a(r) is a constant, α=2.65718, the period T=0.67 mm$^2$ in r$^2$ space, and the argument angle modulation function S(r) represents a constant phase shift S=0.50*T. The computer simulated light intensity distributions assume a biconvex lens body designed for targeting a zero order focal point at 20 diopter, D, and first order focal points at 21.675 D and 18.325 D, symmetrically positioned with respect to the zero order.

FIG. 9a illustrates that for an ophthalmic lens, in accordance with the present disclosure, having the phase profiles of equations (15) and (11) or phase profiles having a similar shape, i.e. a periodic sinusoidal or continuous wave type diffraction grating 91, having alternating crest 98 and trough 99 amplitude values, and a continuous curved monofocal central zone 92, improved diffraction efficiency and a relative smooth transition in the height profiles from the central zone 92 to the diffraction grating 91 is achieved, when the transition point 93, at which the monofocal central zone ends and the diffraction grating starts, being located closer to a crest 98 than a trough 99 of the diffraction grating 91.

In FIG. 9a, the transition point 93 is shown at the side of the crest 100 adjacent to the optical axis of the lens at r=0. However, the transition point may also be located at the other side of the crest 100, i.e. adjacent to the outer circumference of the lens, as indicated by the dash-dot line 94. It is noted that in the latter case, the position of the transition point 94 is still related to the position of the crest amplitude value 100.

FIG. 9b shows the height profiles of FIG. 9a in r$^2$ space. In particular, a relative smooth transition from the amplitude profile of the monofocal central zone to the amplitude profile of the periodic diffraction grating is obtained when the transition point 93 occurs such that the distance 95 between the transition point 93, or the transition point 94, and the nearest crest amplitude value 100 measured in r$^2$ space is less than 0.25*T, i.e. less than 0.25 times the period or pitch distance T of the diffraction grating in r$^2$ space, and preferably less than 0.2*T. Such as illustrated in FIG. 9b. Again it is noted that in case of the transition point 94, this distance is still related to the position of the crest amplitude value 100, although this amplitude value is not directly visible in the final lens profile, but can be easily reconstructed from measurements at the lens profile.

That is, the transition point 93 or 94 is close to a crest 100 of the amplitude profile 91 of the periodic diffraction grating near the surface 90 of the lens body, where the amplitude profile h(r) of the monofocal central zone 92 and the amplitude profile H(r) of the periodic diffraction grating merge at a leading or rising edge of the amplitude profile H(r) of the diffraction grating, indicated by a dashed circle 97 in FIG. 9.

Still alternatively formulated, a smooth transition in the amplitude profiles h(r) and H(r) and an improved diffraction efficiency is obtained when the transition point 93 or 94 is positioned in the encircled area 97 at a rising or falling edge of the periodic diffraction profile 91. Thus an edge of the periodic diffraction profile 91 from a trough 99 to a crest 98 of the profile or from a crest 99 to a trough 98.

The encircled area 97 may cover a range measured transverse to and from the surface 90 of the lens body, of about 10 to 30% of the maximum amplitude 96, i.e. half of the top-top amplitude, of the amplitude profile 91 of the periodic diffraction grating.

FIGS. 9a and 9b are calculated for a diameter of the central zone of 1.04 mm, a design wavelength λ of the lens assumed at 550 nm, the index of refraction n of the lens body set to 1.492, the index of refraction $n_m$ of the medium surrounding the lens body assumed to be 1.336, the amplitude modulation function A(r) being a constant at 1.02, the argument magnitude modulation function a(r) is a constant, α=2.65718, the period T=0.67 mm$^2$ in r$^2$ space, and the argument angle modulation function S(r) represents a constant phase shift S=0.32*T. Providing focal points at 20 D+/−1.625 D, i.e. 18.375 D, 20.0 D, and 21.625 D and adjusted heights of the monofocal center zone.

In the transition point, an included angle β between the tangent of the amplitude profile h(r) of the monofocal central zone and the tangent of the amplitude profile of the amplitude profile H(r) along the edge of the periodic diffraction profile from a trough to a crest thereof viewed in a direction towards the surface of the lens body being less than about 1 degree, provides also a pointer to a relative smooth transition in the amplitude profile of the monofocal central zone to the amplitude profile of the periodic diffraction grating. If the smooth profiles shown here are used the angle β at the transition point will rarely be over 1 degree for a central zone of about 1 mm, but same may be higher with different profiles. The angle will also be higher for larger central zones. Note that in the profile figures the angle at the transition point often appears large, due to the asymmetric scaling of the horizontal and vertical axes.

Instead of or in addition to the adaptation of the size of the monofocal central zone, i.e. the radius or distance to the optical axis, as discussed above with reference to FIG. 7, the position of the transition point where the monofocal central zone ends and the diffraction grating starts may also be set by adapting any or both of the argument angle of the phase profile function of the diffraction grating and amplitude modulation functions of the phase profile function.

Assume a phase profile function $\phi(r)$ of the diffraction grating in accordance with equation (5) wherein $F[\alpha*G]$ is an inverse tangent function and $G(r)$ is a sine function:

$$\phi(r) = A(r) * F\left[\alpha(r) * G\left(\frac{2\pi\{r^2 - S(r)\}}{T}\right)\right] + B(r) \quad (16)$$

resulting in an amplitude or height profile $H(r)$:

$$H(r) = A(r) * \frac{\lambda}{2\pi(n - n_m)} * \tan^{-1}\left[\alpha(r)\sin\left(\frac{2\pi\{r^2 - S(r)\}}{T}\right)\right] + B(r) * \frac{\lambda}{2\pi(n - n_m)} \quad (17)$$

By adapting or setting any of the argument angle modulation function $S(r)$ and/or the light distribution parameter $a(r)$, the periodic diffraction profile is shifted in its phase or position in radial direction across the lens surface, such to establish a smooth transition of the coinciding amplitude profiles $h(r)$ of the monofocal zone and $H(r)$ of the diffraction grating at the transition point in accordance with the present disclosure.

A smooth transition of the amplitude profiles $h(r)$ of the monofocal zone and $H(r)$ of the diffraction grating at the transition point in accordance with the present disclosure, separate from or in addition to the measures outlined above, may also require to adapt any or both of the amplitude modulation functions $A(r)$ and $B(r)$ of the phase profile function in accordance with equation (17) above.

As disclosed by WO2019020435, the teachings of which are here incorporated by reference, the diffraction efficiency, i.e. the amount of optical power that is directed into the targeted diffraction orders or targeted focal points can be effectively tuned, for achieving a respective target light distribution or focus enhancement, in particular for providing a pupil dependent light distribution in the focal points, by shifting and amplitude modulating the phase profile of the diffraction grating dependent on the radial distance to the optical axis of the lens. In this manner, an effect on a desired light distribution in the target focal points by adapting the diffraction grating for obtaining a smooth transition of the amplitude profiles of the monofocal central zone and the diffraction grating can be effectively reduced or compensated for several pupil sizes.

FIG. 10 illustrates, in a graphical manner, computer simulations of ophthalmic lenses designed in accordance with the present disclosure, based on phase profiles for the diffraction grating and a far vision monofocal central zone in accordance with equations (11) and (15) above, respectively, as a function of the argument modulation function or parameter $S(r)$. The lenses simulated in FIG. 10 all have a far vision monofocal central zone having a diameter of 1.1 mm. The intensity values for the focal points are sampled at a 3 mm aperture, simulating an eye having a pupil with 3 mm diameter. For the trifocal grating in each lens $S(r)$ is static over all diameters, having the value indicated by the horizontal axis.

Each lens is in a computer program automatically constructed in the following way: 1) the monofocal central zone is constructed with the desired optical power, 2) the diffractive grating is created according to any number of techniques, including application of $S(r)$, and 3) the difference in height between the central zone and the diffractive grating at the desired transition point is calculated and then compensated for, such that there is no vertical jump.

The top part of FIG. 10 illustrates, along the vertical axis and in arbitrary units, the calculated absolute intensity of the light coupled into the intermediate 103, far 101 and near 102 focal points, as function of the parameter S, expressed in periods along the horizontal axis. That is $S(r)$ is a constant phase shift provide by S*T. The middle part of FIG. 10 illustrates the sum 104 of the absolute intensities 101, 102 and 103, as a function of S, and the lower part of FIG. 10 illustrates the ratio of the amount of light coupled into the far focal point and in the near focal point, far/near ratio 105, also as a function of S. The intensities are calculated for a far vision monofocal central zone having a diameter of 1.1 mm.

FIG. 11 illustrates in a similar manner as FIG. 10, computer simulated intensity profiles for different values of the parameter S of an ophthalmic lens designed in accordance with the present disclosure, based on a pupil size or aperture size of 3 mm diameter.

The top part of FIG. 11 illustrates the calculated absolute intensity of the light coupled into the intermediate 110, far 111 and near 112 focal points, as function of S, expressed in periods along the horizontal axis. The middle part of FIG. 11 illustrates the sum 113 of the absolute intensities 110, 111 and 112, as a function of S, and the lower part of FIG. 11 illustrates the far/near ratio 114, also as a function of S. The intensities are calculated for a far vision monofocal central zone having a diameter of 0.98 mm.

From FIGS. 10 and 11, as indicated by the vertical dash-dot lines 106, 107 and 115, 116, respectively, it is seen that for a monofocal central zone having a diameter of 1.1 mm and 0.98 mm, respectively, for S values between about 0.1 and 0.3 relative high overall intensity values individually and summed are provided, combined with a relative stable, i.e. less volatile, far/near intensity ratio between acceptable levels of about 2-3.

FIG. 12 shows in a three-dimensional graphical view 120, based on ophthalmic lens designs in accordance with FIGS. 6a, 10 and 11, the sum intensity of the light in the three focal points, depicted in arbitrary units along the vertical or z-axis in the figure, as a function of both the radius of the central zone, depicted in µm along the y-axis, and the S parameter, depicted along the x-axis. Each rasterpoint 121 in the xy-plane represents one lens design, the intensities of the three focal points are sampled in the model at an aperture of 3 mm.

To evaluate designs from this plot the two main concepts to judge from are theoretical performance and manufacturability. A high sum intensity indicates high performance. For the specific choice of parameters for the central zone and the grating used in FIG. 12 the highest possible overall performance can be found for a central zone radius around 0.550 mm and an S-value of around 0.1 to 0.35. There is a plateau visible in FIG. 12, the encircled area 122, because of which the summed intensity is fairly similar in the indicated range of S-values.

The underlying distribution between the different focal points will differ even when the sum is identical. However, in manufacturing there is always some degree of error. As is visible in the figure the combination of a central zone radius of 0.550 mm and an S-value of either 0.1 or 0.35 places the designed lens very close to efficiency drop-off. A small deviation in S might a fabricated lens behave like a lens with smaller or larger S-value. Because of this it is generally advantageous to choose a design from the central zone of a plateau of high performance, having a positive effect on manufacturing yield.

FIG. 13 shows in a three-dimensional graphical view 130, based on ophthalmic lens designs in accordance with FIGS. 10 and 11, the far/near ratio of the intensity of the light in the far and near focal points, depicted along the vertical or z-axis in the figure, as a function of both the radius of the central zone, depicted in μm along the y-axis, and the S parameter, depicted along the z-axis.

This figure can be used for choosing a design in a way similar to FIG. 12. The far/ratio will determine the distribution of light and consequently visual acuity at respective distances. So the absolute value is important. However, manufacturability is also here an important factor. It is seen from the figure that there are several very sharp ridges. Manufacturing a lens close to one of these ridges will often decrease manufacturing yield, since a small deviation can have a very large negative effect. FIG. 14 shows in a three-dimensional graphical view 140, based on ophthalmic lens designs in accordance with FIGS. 10 and 11, along the dimensionless z-axis, the horizontal distance of a transition point to the crest amplitude, expressed in periods of the diffraction grating between the transition point and highest point, i.e. the crest amplitude or peak, viewed in $r^2$ space. The ±sign refers to a distance at the one or the other side of the crest amplitude value. See also FIGS. 9a and 9b. For some lenses this crest amplitude or highest peak might not be extant in the resulting lens, the distance should be calculated assuming the peak in the original diffractive grating, before a part of it is replaced with the monofocal central zone.

FIG. 14 shows this distance as a function of both the radius of the central zone, depicted in μm along the y-axis, and the S parameter, depicted along the z-axis. A zero value on the z-axis indicates a lens that is created with the transition point at the highest point, i.e. the crest, of the present period. The line denotating the lenses created with the central zone precisely at the peak of the present period are easy to locate in FIG. 14.

By comparing FIG. 14 with FIG. 12 it can be seen that the line in FIG. 14 demarcating the lenses with transition zones at the peak or crest amplitude value of the present period also demarcates the longitudinal center of the high performance plateau 122 found in FIG. 12. This shows that one may expect well performing lenses with high yields to have transition zones closer to the nearest peak than to the nearest through. Especially advantageous are lenses where the absolute distance between the transition zone to the highest peak of the period, when viewed in r2 space is less than about 0.25*T, and preferably less than 0.2*T.

From the graphs in FIGS. 10-14, it can be seen that an optimal design space for lenses in accordance with the present disclosure occurs when the transition point is at a radial position such that the monofocal central zone has a diameter in the range of 0.8-1.3 mm, and a ratio of intensities of incident light distributed in the target focal points for far and near vision is in a far/near ratio range of 0.8-2.0.

FIG. 15a illustrates, by way of example, a height profile or amplitude profile of another embodiment of a trifocal ophthalmic lens in accordance with the present disclosure, along a linear scale as function of the radial distance r, expressed in mm.

The amplitude profile or height profile of the embodiment of the ophthalmic lens illustrated in FIG. 15a comprises a central zone, i.e. the central part 33 of the lens 31 shown in FIG. 2a, having a continuous amplitude profile h(r), indicated by reference numeral 152, in accordance with equation (11) disclosed above, and a diffraction grating 151, based on the continuous periodic phase profile function in accordance with equation (6) provided above in the Summary part.

The amplitude of the height profiles h(r) 162 and H(r) 161 is depicted at μm scale along the vertical axis of FIG. 16a. The optical axis, running through the center of the lens body, is assumed to be at a radial position r=0, whereas the radial distance r measured in outward direction from the optical axis is expressed in mm along the vertical axis. Reference numeral 160 refers to the outer circumference of the front surface 34 of the lens body 30, as illustrated in FIGS. 2a and 2b.

The central zone extends over a distance in radial direction r from the optical axis, across part of the surface 150 of the lens body, and its continuous amplitude profile h(r) 152 is designed to provide a single focal point coinciding with the diffractive focal point for far vision of the diffraction profile 151, hence providing a monofocal central zone.

At a transition point 153, at a radial position of the lens body at a distance of about 0.5 mm from the optical axis, the continuous amplitude profile h(r) 152 of the monofocal central zone ends and continuous in the amplitude profile H(r) 151 of the diffraction grating. In the embodiment shown, the transition point 153 is at the surface 150 of the lens body.

In this embodiment, the design wavelength λ of the lens is assumed at 550 nm, the index of refraction n of the lens body is set to 1.492, and the index of refraction $n_m$ of the medium surrounding the lens body is assumed 1.336. The diffraction grating 151 is optimized using equations (7) and (8) to provide relative intensities $(\gamma_1, \gamma_2, \gamma_3)$ of the respective diffraction orders −1, 0, 1, respectively, of (1.2, 1, 1). The grating is optimized to provide more light to the near vision focus, to compensate to some extent for the light intensity provided by the monofocal central zone to the far vision focal point.

The amount of light diffracted by the lens having the central zone profile 152 and the diffraction profile 151 is shown in the intensity simulation diagram of FIG. 15b, based on a pupil size of 3 mm diameter. The intensity is depicted along the vertical axis, in arbitrary units. The computer simulated light intensity distributions assume a biconvex lens body of an ophthalmic lens of the type shown in FIGS. 2a, 2b, designed for targeting a zero order focal point at 20 diopter, D, and focal points for near and far vision at 21.675 D and 18.325 D, respectively, symmetrically positioned with respect to the zero order. Reference numeral 154 refers to diffraction order 0, providing a focal point for intermediate vision, reference numeral 155 refers to the focal point for far vision at 18.325 D and reference numeral 156 refers to the near vision focal point at 21.675 D.

FIG. 16a illustrates, by way of example, a height profile or amplitude profile of a pentafocal lens in accordance with the present disclosure, in $r^2$ space, expressed in $mm^2$, and FIG. 16b shows the same height profile or amplitude profile along a linear scale as function of the radial distance r, expressed in mm.

The amplitude profile or height profile of the embodiment of the pentafocal ophthalmic lens illustrated in FIG. 16a comprises a central zone, i.e. the central part 33 of the lens 31 shown in FIG. 2a, having a continuous amplitude profile h(r), indicated by reference numeral 162, in accordance with equation (11) disclosed above, and a diffraction grating 161, producing five different focal points.

$\phi_{lin}(x)$ of the linear phase grating that the diffractive part of the lens is based on can be described by the set of equations (18) below:

$$Q = \mu_1\gamma_1 \sin(-2x*2\pi+\alpha_a) + \mu_2\gamma_2 \sin(-x*2\pi\alpha_2) + \mu_3\gamma_3 \sin(\alpha_3) + \mu_4\gamma_4 \sin(x*2\pi+\alpha_4) + \mu_5\gamma_5 \sin(2x*2\pi\alpha_5)$$

$$P = \mu_1\gamma_1 \cos(-2x*2\pi+\alpha_a) + \mu_2\gamma_2 \cos(-x*2\pi\alpha_2) + \mu_3\gamma_3 \cos(\alpha_3) + \mu_4\gamma_4 \cos(x*2\pi+\alpha_4) + \mu_5\gamma_5 \sin(2x*2\pi\alpha_5)$$

$$\phi_{lin}(x) = \operatorname{atan2}(Q,P) \qquad (18)$$

wherein: atan2 refers to the 2-argument arctangent, $\gamma_1, \gamma_2, \gamma_3, \gamma_4, \gamma_5$ represent the relative intensities of the respective diffraction orders −1, 0, 1, respectively, $\alpha_1, \alpha_2, \alpha_3, \alpha_4, \alpha_5$ represent the phases of the respective Fourier coefficients of the phase profile function, $\mu_1, \mu_2, \mu_3, \mu_4, \mu_5$ are constants to be optimized, and $|\alpha_k|/\gamma_k = N$, wherein N is a positive constant, and $|\alpha_k|$ represents the amplitude of Fourier coefficient $\alpha_k$ of the diffraction grating, for k=1, 2, 3, x is the axis over which the grating is extending.

With this definition one period is exactly 1 unit long.

A multifocal lens with five focal points can with equation set (18) be achieved by applying equation (8) above, analogous how a trifocal lens is created.

The linear phase grating (14) is based on teachings of the present disclosure and the publication by Romero, Louis A, and Fred M. Dickey, "Theory of optimal beam splitting by phase gratings. II. Square and hexagonal gratings." JOSA A 24.8 (2007): 2296-2312. The linear phase grating is optimized for five diffraction orders with the intensity distribution $(\gamma_1, \gamma_2, \gamma_3, \gamma_4, \gamma_5) = (1.1, 0.9, 0.8, 0.9, 1.1)$, for example.

The amplitude of the height profiles h(r) 162 and H(r) 161 is depicted at μm scale along the vertical axis of FIG. 16a. The optical axis, running through the center of the lens body, is assumed to be at a radial position r=0, whereas the radial distance r measured in outward direction from the optical axis is expressed in mm along the vertical axis. Reference numeral 160 refers to the outer circumference of the front surface 34 of the lens body 30, as illustrated in FIGS. 2a and 2b.

The central zone extends over a distance in radial direction r from the optical axis, across part of the surface 160 of the lens body, and its continuous amplitude profile h(r) 162 is designed to provide a single focal point coinciding with the diffractive focal point for far vision of the diffraction profile 161, hence providing a monofocal central zone.

At a transition point 163, at a radial position of the lens body at a distance of about 0.6 mm from the optical axis, the continuous amplitude profile h(r) 162 of the monofocal central zone ends and continuous in the amplitude profile H(r) 161 of the diffraction grating. In the embodiment shown, the transition point 163 is at the surface 160 of the lens body.

In this embodiment, the design wavelength A of the lens is assumed at 550 nm, the index of refraction n of the lens body is set to 1.4618, and the index of refraction $n_m$ of the medium surrounding the lens body is assumed 1.336. The period T=0.733 $mm^2$ in $r^2$ space, and the argument angle modulation function S(r) represents a constant phase shift $S=0.80*T \cdot A(r)=\gamma(r)=\delta(r)=1$.

The amount of light diffracted by the lens having the central zone profile 162 and the diffraction profile 161 is shown in the intensity simulation diagram of FIG. 16c, based on a pupil size of 3 mm. The intensity is depicted along the vertical axis, in arbitrary units. The computer simulated light intensity distributions assume a biconvex lens body of an ophthalmic lens of the type shown in FIGS. 2a, 2b, designed for targeting a zero order focal point at 20 diopter, D, and focal points for near and far vision at 21.675 D and 18.325 D, respectively, symmetrically positioned with respect to the zero order. Reference numeral 164 refers to diffraction order 0, providing a focal point for intermediate vision, reference numeral 165 refers to the focal point for far vision at 18.325 D and reference numeral 166 refers to the near vision focal point at 21.675 D.

In the present design, two additional focal points are provided, i.e. a first additional focal point at 19 D, between the focal points for intermediate and far vision, and a second additional focal point at 21 D, between the focal points for intermediate and near vision.

For the purpose of the present application, other continuous periodic phase profile functions for providing pentafocal lenses may be applied, than the one presented above in accordance with equation (14). As indicated, also quad-focal lenses may be provided, having a monofocal central zone in accordance with the present disclosure.

The simplified flow diagram 170 in FIG. 17 illustrates steps of a method of manufacturing an ophthalmic multifocal lens, according to a second aspect of the present disclosure. The direction of the flow is from the top to the bottom of the drawing.

In a first step, at least target focal points for near, intermediate and far vision of the lens are set, i.e. block 171 "Set target focal points".

In a second step, a target relative light distribution between the different focal points for different pupil sizes of a user are determined, i.e. block 172 "Set relative light distributions". The selected pupil sizes may, for example, range from diameter values of 0-3 mm, 0-4.5 mm, and 0-6 mm. Above 6 mm the lens may, for example, exhibit bifocal properties, i.e. relating to intermediate and far vision. Next, a light transmissive lens body is selected, having a refractive focal point providing the target focal point for intermediate vision, i.e. block 173 "Select lens body".

In a further step, i.e. block 174 "Provide monofocal central zone", a monofocal central zone extending over a distance in radial direction r from the optical axis of the lens body across part of the surface of the lens body is provided. This monofocal central zone has a continuous phase profile function φ(r) for providing a refractive focal point coinciding with one of the target focal points for far and near vision, set in the first step above.

For providing the diffractive focal points, a continuous periodic phase profile function φ(r) of a diffraction grating is calculated, either mathematically or numerically using a suitable programmed processor or computer, i.e. step 175 "Calculate diffractive phase profile". The continuous periodic phase profile function be calculated for establishing the desired light distribution in the target refractive and diffractive focal points over the complete lens, including the contribution of the monofocal central zone, for different pupil sizes.

In step 176, "Determine transition point", the transition point at a radial distance from the optical axis where the monofocal centrals zone ends and the diffractive profile starts is determined, at this transition point the diffraction grating and the monofocal central zone have coinciding amplitude values, as taught in the first aspect of the present disclosure above. To this end, the amplitude of the height profile of the monofocal central zone and/or the amplitude of the height profile of the diffraction grating may be adjusted.

The transition point may be determined, in step 176, as taught in the first aspect of the present disclosure, for example based on the light distribution in the target focal points of light incident on the lens, such that for a given aperture size:

intensities of light distributed in each of the target focal points are within a predetermined intensity range for each individual target focal point, and a sum intensity of light distributed in the target focal points is in a predetermined summation range, and a ratio of intensities of light distributed in the target focal points for far and near vision is in a predetermined ratio range.

In a next step, the calculated phase profile functions and the transition point are adapted for fine-tuning and/or smoothing of the desired or target optical properties of the lens, such as a desired relative light distribution among the target focal points, i.e. step 177 "Intensity tuning". This intensity tuning may be likewise processed by a suitably programmed processor or computer and may involve modulation as taught and shown in the examples above. This, also for taking into account optical deviations in the target focal points and profile as a result of tolerances and the like in the machining or manufacturing of the lens, for example.

Finally, the geometric height profile or amplitude profile of the monofocal central zone and the diffraction grating are calculated for manufacturing the lens, i.e. step 178 "Processing height profiles". Again using a suitably programmed processor.

Finally, the height profile or height function applied at the lens body is machined and polished by any of laser micro machining, diamond turning, 3D printing, or any other machining or lithographic surface processing technique, for example. That is step 179, "Machining".

The calculations in step 175 may be based on power spectrum calculations from a Fourier series representation of the diffraction grating, such that a summation of squared absolute values of Fourier coefficients of diffraction orders associated with the target focal points is maximum. As noted above, this calculation may be performed under the constraint of equal or weighted target light intensities in the target focal points.

The calculations according to the present disclosure may be provided remote from the equipment for machining the lens. Particularities of the calculated diffraction grating may be forwarded to the machining equipment by a data transfer over a telecommunication network available in practice, such as the Internet (not shown).

Those skilled in the art will appreciated that the monofocal central zone and the diffraction grating may be applied at one or both of the anterior and the posterior surface of the lens, which is applicable to all of the embodiments disclosed and claimed by the attached claims.

It is further noted that the teachings according to the present disclosure are equally applicable for designing and tuning the light distribution of a multifocal ophthalmic lens having apodized height or amplitude profiles.

Other variations to the disclosed examples and embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope thereof. Same reference signs refer to equal or equivalent elements or operations.

The subject-matter of the disclosure may also relate, among others, to the following aspects:

1. An ophthalmic multifocal lens, at least comprising focal points for near, intermediate and far vision, said lens having a light transmissive lens body comprising a diffraction grating extending concentrically in radial direction r from an optical axis of said lens body across part of a surface of said lens body, said lens body being designed for providing a refractive focal point for intermediate vision, said diffraction grating having a phase profile $\phi(r)$ expressed as a single continuous periodic function arranged for varying a phase of incident light at said lens body and operating as an optical wave splitter at least providing a diffractive focal point for near vision at diffraction order +m and a diffractive focal point for far vision at diffraction order −m, wherein m is a positive integer value, characterized in that said lens body comprises a refractive monofocal central zone extending over a distance in radial direction r from said optical axis of said lens body across part of said surface of said lens body, and having a continuous phase profile function $\varphi(r)$ arranged for varying a phase of incident light at said lens body providing a focal point coinciding with one of said diffractive focal points, wherein said diffraction grating is provided from a transition point at a radial position of said lens body where said monofocal central zone ends, at said transition point said diffraction grating and said monofocal central zone have coinciding amplitude values.

2. The ophthalmic multifocal lens according to aspect 1, wherein said diffraction grating comprises a wave type diffraction pattern, having alternating crest and trough amplitude values, said transition point being located closer to a crest amplitude value than a trough amplitude value of said diffraction grating.

3. The ophthalmic multifocal lens according to aspect 2, wherein a distance between said transition point and said crest amplitude value measured in radial direction r of said lens body, when viewed in $r^2$ space, is less than 0.25 times a period of said diffraction grating in $r^2$ space, preferably less than 0.2 times a period of said diffraction grating in $r^2$ space.

4. The ophthalmic multifocal lens according to any of the previous aspects 1-3, wherein said transition point is set by adapting at least one of a radius of said monofocal central zone, an argument and amplitude of an amplitude profile H(r) of said diffraction grating, based on said phase profile function $\phi(r)$ of said diffraction grating, and an argument and amplitude of an amplitude profile h(r) of said monofocal central zone, based on said phase profile function $\varphi(r)$ of said monofocal central zone.

5. The ophthalmic multifocal lens according to any of the previous aspects 1-4, wherein said diffraction grating and said monofocal central zone extend in radial direction r across part of said surface of said lens body symmetrically with respect to said optical axis of said lens body.

6. The ophthalmic multifocal lens according to any of the previous aspects 1-5, wherein said lens body, said diffraction grating and said monofocal central zone are arranged for providing monofocal properties at a first area of said lens body including said optical axis, a focal point of said first area coinciding with one of diffractive focal points provided by said diffraction grating, providing multifocal properties at a second area of said lens body extending beyond said first area in radial direction of said lens, and providing bifocal properties at a third area of said lens body extending beyond said second area in radial direction of said lens towards a circumferential edge of said lens body.

7. The ophthalmic multifocal lens according to any of the previous aspects 1-6, wherein said monofocal central zone comprises a focal point coinciding with a diffractive focal point for far vision.

8. The ophthalmic lens according to any of the previous aspects 1-7, wherein said transition point is at a radial position such that said monofocal central zone has a diameter in the range of 0.8-1.3 mm, and a ratio of intensities of incident light distributed in said target focal points for far and near vision is in a far/near ratio range of 0.8-2.0.

9. The ophthalmic lens according to any of the previous aspects 1-8, wherein said phase profile function $\varphi(r)$ of said monofocal central zone is defined by:

$$\varphi(r) = -2\pi \frac{\sqrt{r^2 + f^2} - f}{\lambda}$$

wherein:
r is distance in radial direction from said optical axis of said lens body, [mm],
f is focal distance of said monofocal central zone, [mm],
in particular wherein said phase profile function $\varphi(r)$ of said monofocal central zone is defined by:

$$\varphi(r) = -\pi \frac{r^2}{\lambda f}.$$

10. The ophthalmic lens according to any of the previous aspect 1-9, wherein said phase profile function $\phi(r)$ of said diffraction grating is defined by:

$$\phi(r) = A(r) * F\left[\alpha(r) * G\left(\frac{2\pi\{r^2 - S(r)\}}{T}\right)\right] + B(r)$$

wherein:
r distance in radial direction from said optical axis of said lens body, [mm],
A(r) is an amplitude modulation function of said phase profile function $\phi(r)$ in radial direction of said lens body,
F[α(r)*G(r)] is a function in radial direction of said lens body providing said wave splitter operation,
G(r) is a continuous periodic function in $r^2$ space,
a(r) is an argument magnitude modulation function of G(r),
S(r) is an argument angle modulation function of G(r) in $r^2$ space, [mm$^2$],
T is a period or pitch of said diffraction grating in $r^2$ space, [mm$^2$], and
B(r) is an amplitude modulation function of said continuous periodic phase profile function.

11. The ophthalmic lens according to aspect 10, wherein said phase profile function $\phi(r)$ of said diffraction grating is defined by:

$$\phi(r) = A(r)\tan^{-1}\left[\alpha * \sin\left(\frac{2\pi\{r^2 - S(r)\}}{T}\right)\right]$$

wherein:
S(r) has a constant value ranging between $-0.5*T$ and $0.5*T$ in $r^2$ space,
A(r) has a constant value, ranging between 1.05 and 1.15, and
a(r) has a constant value ranging between 2.5 and 3.

12. The ophthalmic lens according to any of the aspects 1-11, wherein said diffraction grating is designed to operate as a symmetric optical wave splitter comprising diffractive focal points at diffraction orders +1, 0 and −1, and said phase profile function $\phi(r)$ of said diffraction grating is defined by:

$$\phi(r) = A(r) * \phi_{lin}\left(\frac{r^2 - S(r)}{T}\right) + B(r)$$

wherein:
r distance in radial direction from said optical axis of said lens body, [mm],
A(r) is an amplitude modulation function of said phase profile function $\phi(r)$ in radial direction of said lens body,
S(r) is an argument angle modulation function of in $r^2$ space, [mm$^2$],
T is a period or pitch of said diffraction grating in $r^2$ space, [mm$^2$],
B(r) is an amplitude modulation function of said continuous periodic phase profile function, and $$\phi_{lin}(x) = \tan^{-1}\left(\frac{\mu_1\gamma_1\sin(-x*2\pi + \alpha_1) + \mu_2\gamma_2\sin(\alpha_2) + \mu_3\gamma_3\sin(x*2\pi + \alpha_3)}{\mu_1\gamma_1\cos(-x*2\pi + \alpha_1) + \mu_2\gamma_2\cos(\alpha_2) + \mu_3\gamma_3\sin(x*2\pi + \alpha_3)}\right)$$

wherein:
$\gamma_1, \gamma_2, \gamma_3$ represent the relative intensities of the respective diffraction orders −1, 0, 1, respectively,
$\alpha_1, \alpha_2, \alpha_3$ represent the phases of the respective Fourier coefficients of the phase profile function,
$\mu_1, \mu_2, \mu_3$ are constants to be optimized, and
$|\alpha_k|/\gamma_k=N$, wherein N is a positive constant, and $|\alpha_k|$ represents the amplitude of Fourier coefficient $\alpha_k$ of the diffraction grating, for k=1, 2, 3, and
x is the axis over which $\phi_{lin}(x)$ extends.

13. A method of manufacturing an ophthalmic multifocal lens, at least comprising focal points for near, intermediate and far vision, said lens having a light transmissive lens body comprising a diffraction grating extending concentrically in radial direction r from an optical axis of said lens body across part of a surface of said lens body, said lens body being designed for providing a refractive focal point for intermediate vision, said diffraction grating having a phase profile $\phi(r)$ expressed as a single continuous periodic function arranged to be periodic in $r^2$ space for varying a phase of incident light at said lens body and operating as a symmetrical optical wave splitter at least providing a diffractive focal point for near vision at diffraction order +m and a diffractive focal point for far vision at diffraction order −m, wherein m is a positive integer value, said method comprising the steps of:

determining target focal points for near, intermediate and far vision of said multifocal lens, providing said light transmissive lens body having said target focal point for intermediate vision, and providing said diffraction grating having said target focal points for near and far vision, characterized by the further steps of:

providing a monofocal central zone extending over a distance in radial direction r from said optical axis of said lens body across part of said surface of said lens body and having a continuous phase profile function $\varphi(r)$ arranged for varying a phase of incident light at said lens body providing a focal point coinciding with one of said target focal points for far and near vision, determining an amplitude profile H(r) of said diffraction grating based on said phase profile function $\phi(r)$ of said diffraction grating, and an amplitude profile h(r) of said monofocal central zone based on said phase profile function $\varphi(r)$ of said monofocal central zone, determining a transition point at a radial position of said lens body where said monofocal central zone ends, at said transition point said diffraction grating and said monofocal central zone have coinciding amplitude values, and applying said monofocal central zone and said diffraction grating in accordance with said determined transition point.

14. The method according to aspect 13, whereby said diffraction grating comprises a wave type diffraction pattern having alternating crest and trough amplitude values, wherein said transition point is located closer to a crest amplitude value than a trough amplitude value of said diffraction grating.

15. The method according to aspect 14, wherein said transition point is located such that a distance between said transition point and said crest amplitude value measured in radial direction r of said lens body, when viewed in $r^2$ space, is less than 0.25 times a period of said diffraction grating in $r^2$ space, preferably less than 0.2 times a period of said diffraction grating in $r^2$ space.

16. The method according to aspects 13, 14 or 15, wherein at least one of said amplitude profile h(r) of said monofocal central zone and said amplitude profile H(r) of said diffraction grating is adapted providing coinciding amplitude values of said monofocal central zone and said diffraction grating at said transition point.

17. The method according to aspect 13, 14, 15 or 16, further comprising determining said transition point and a shift in radial direction of said diffraction grating based on the distribution in said target focal points of light incident on said lens, such that for a given aperture size:

intensities of light distributed in each of said target focal points are within a predetermined intensity range for each individual target focal point, and a sum intensity of light distributed in said target focal points is in a predetermined summation range, and a ratio of intensities of light distributed in said target focal points for far and near vision is in a predetermined ratio range.

18. An ophthalmic multifocal lens according to any of the previous aspects 1-17, arranged as one of a contact lens, an intraocular lens, an aphakic contact lens, an aphakic intraocular lens, and a spectacle lens.

The invention claimed is:

1. An ophthalmic multifocal lens, at least comprising focal points for near, intermediate and far vision, said ophthalmic multifocal lens comprising:

a light transmissive lens body comprising a diffraction grating that is symmetric providing diffraction orders that are regularly spaced at both sides of a zero order, the diffraction grating extending concentrically in a radial direction r from an optical axis of said lens body across part of a surface of said lens body, said lens body being designed to provide a refractive focal point for intermediate vision, said diffraction grating having a phase profile $\phi(r)$ expressed as a single continuous periodic function arranged to be periodic in $r^2$ space for varying a phase of incident light at said lens body and said diffraction grating operable as a symmetric optical wave splitter providing a plurality of diffractive focal points comprising a first diffractive focal point for near vision at diffraction order +m and a second diffractive focal point for far vision at diffraction order −m, and wherein said lens body further comprises a refractive monofocal central zone extending over a distance in the radial direction r from said optical axis of said lens body across part of said surface of said lens body, and having a continuous phase profile function $\varphi(r)$ arranged to vary a phase of incident light at said lens body providing a focal point coinciding with one of said diffractive focal points, wherein said diffraction grating is provided from a transition point at a radial position of said lens body where said monofocal central zone ends, at said transition point said diffraction grating and said monofocal central zone have coinciding amplitude values so that a sharp edge at the transition point is avoided, wherein said diffraction grating comprises a wave type diffraction pattern without any sharp edges, having alternating crest and trough amplitude values, said transition point being located closer to a crest amplitude value than a trough amplitude value of said diffraction grating.

2. The ophthalmic multifocal lens according to claim 1, wherein a distance between said transition point and said crest amplitude value measured in the radial direction r of said lens body, when viewed in $r^2$ space, is less than 0.25 times a period of said diffraction grating in $r^2$ space.

3. The ophthalmic multifocal lens according to claim 1, wherein a distance between said transition point and said crest amplitude value measured in the radial direction r of said lens body, when viewed in $r^2$ space, is less than 0.2 times a period of said diffraction grating in $r^2$ space.

4. The ophthalmic multifocal lens according to claim 1, wherein said diffraction grating and said monofocal central zone extend in the radial direction r across part of said surface of said lens body symmetrically with respect to said optical axis of said lens body.

5. The ophthalmic multifocal lens according to claim 1, wherein said lens body, said diffraction grating and said monofocal central zone are arranged to provide monofocal properties at a first area of said lens body including said optical axis, multifocal properties at a second area of said lens body extending beyond said first area in the radial direction of said lens body, and bifocal properties at a third area of said lens body extending beyond said second area in radial direction of said lens body towards a circumferential edge of said lens body, wherein a focal point of said first area coincides with one of the diffractive focal points provided by said diffraction grating.

6. The ophthalmic multifocal lens according to claim 1, wherein said monofocal central zone comprises a focal point coinciding with the second diffractive focal point for far vision.

7. The ophthalmic multifocal lens according to claim 1, wherein said transition point is at a radial position such that said monofocal central zone has a diameter in a range of 0.8-1.3 mm, and a ratio of intensities of incident light distributed in target focal points for far and near vision is in a far/near ratio range of 0.8-2.0.

8. The ophthalmic multifocal lens according to claim 1, wherein said continuous phase profile function $\varphi(r)$ of said monofocal central zone is defined by:

$$\varphi(r) = -2\pi \frac{\sqrt{r^2 + f^2} - f}{\lambda}$$

wherein:
r is distance in the radial direction from said optical axis of said lens body, [mm],
f is focal distance of said monofocal central zone, [mm], in particular wherein said continuous phase profile function $\varphi(r)$ of said monofocal central zone is defined by:

$$\varphi(r) = -\pi \frac{r^2}{\lambda f}.$$

9. The ophthalmic multifocal lens according to claim 1, wherein said continuous phase profile function $\phi(r)$ of said diffraction grating is defined by:

$$\phi(r) = A(r) * F\left[\alpha(r) * G\left(\frac{2\pi\{r^2 - S(r)\}}{T}\right)\right] + B(r)$$

wherein:
r distance in the radial direction from said optical axis of said lens body, [mm],
A(r) is an amplitude modulation function of said continuous phase profile function $\phi(r)$ in the radial direction of said lens body,
F[α(r)*G(r)] is a function in the radial direction of said lens body providing operation for said symmetric optical wave splitter,
G(r) is a continuous periodic function in $r^2$ space,
α(r) is an argument magnitude modulation function of G(r),
S(r) is an argument angle modulation function of G(r) in $r^2$ space, [mm$^2$],
T is a period or pitch of said diffraction grating in $r^2$ space, [mm$^2$], and
B(r) is an amplitude modulation function of said continuous phase profile function.

10. The ophthalmic multifocal lens according to claim 9, wherein said continuous phase profile function $\phi(r)$ of said diffraction grating is defined by:

$$\phi(r) = A(r)\tan^{-1}\left[\alpha * \sin\left(\frac{2\pi\{r^2 - S(r)\}}{T}\right)\right]$$

wherein:
S(r) has a constant value ranging between −0.5*T and 0.5*T in $r^2$ space,
A(r) has a constant value, ranging between 1.05 and 1.15, and
α(r) has a constant value ranging between 2.5 and 3.

11. The ophthalmic multifocal lens according to claim 1, wherein said diffraction grating operates as the symmetric optical wave splitter comprising diffractive focal points at diffraction orders +1, 0 and −1, and said continuous phase profile function $\phi(r)$ of said diffraction grating is defined by:

$$\phi(r) = A(r) * \phi_{lin}\left(\frac{r^2 - S(r)}{T}\right) + B(r)$$

wherein:
r is distance in the radial direction from said optical axis of said lens body, [mm],
A(r) is an amplitude modulation function of said phase profile function $\phi(r)$ in the radial direction of said lens body,
S(r) is an argument angle modulation function of in $r^2$ space, [mm$^2$],
T is a period or pitch of said diffraction grating in $r^2$ space, [mm$^2$],
B(r) is an amplitude modulation function of said continuous phase profile function, and $$\phi_{lin}(x) = \tan^{-1}\left(\frac{\mu_1\gamma_1\sin(-x*2\pi + \alpha_1) + \mu_2\gamma_2\sin(\alpha_2) + \mu_3\gamma_3\sin(x*2\pi + \alpha_3)}{\mu_1\gamma_1\cos(-x*2\pi + \alpha_1) + \mu_2\gamma_2\cos(\alpha_2) + \mu_3\gamma_3\sin(x*2\pi + \alpha_3)}\right)$$

wherein:
$\gamma_1$, $\gamma_2$, $\gamma_3$ represent relative intensities of the respective diffraction orders −1, 0, 1, respectively,
$\alpha_1$, $\alpha_2$, $\alpha_3$ represent the phases of the respective Fourier coefficients of the phase profile function,
$\mu_1$, $\mu_2$, $\mu_3$ are constants to be optimized, and
$|\alpha_k|\gamma_k$=N, wherein N is a positive constant, and $|\alpha_k|$ represents an amplitude of Fourier coefficient $\alpha_k$ of the diffraction grating, for k=1, 2, 3, and
x is the axis over which $\phi_{lin}(x)$ extends.

12. The ophthalmic multifocal lens according to claim 1, wherein the ophthalmic multifocal lens is arranged as one of a contact lens, an intraocular lens, an aphakic contact lens, an aphakic intraocular lens, or a spectacle lens.

13. A method of manufacturing an ophthalmic multifocal lens, at least comprising focal points for near, intermediate and far vision, the method comprising: providing a refractive focal point for intermediate vision with a light transmissive lens body included in the ophthalmic multifocal lens, the lens body comprising a diffraction grating that is symmetrical, the diffraction grating extending concentrically in a radial direction r from an optical axis of said lens body across part of a surface of said lens body; varying a phase of incident light at said lens body with said diffraction grating, said diffraction grating having a phase profile $\phi(r)$ expressed as a single continuous periodic function arranged to be periodic in $r^2$ space; operating said diffraction grating as a symmetrical optical wave splitter to provide a diffractive focal point for near vision at diffraction order +m and a diffractive focal point for far vision at diffraction order −m, wherein m is a positive integer value selected to be 1 or 2;

determining target focal points for near, intermediate and far vision of said ophthalmic multifocal lens;

providing said light transmissive lens body having said target focal point for intermediate vision;

providing said diffraction grating having said target focal points for near and far vision;

providing a refractive monofocal central zone extending over a distance in the radial direction r from said optical axis of said lens body across part of said surface of said lens body and having a continuous phase profile function $\varphi(r)$ arranged for varying a phase of incident light at said lens body providing a focal point coinciding with one of said target focal points for far and near vision;

determining an amplitude profile H(r) of said diffraction grating based on said continuous phase profile function $\phi(r)$ of said diffraction grating, said diffraction grating comprising a wave type diffraction pattern without any sharp edges, having alternating crest and trough amplitude values, and an amplitude profile h(r) of said monofocal central zone based on said continuous phase profile function $\varphi(r)$ of said monofocal central zone;

determining a transition point at a radial position of said lens body where said monofocal central zone ends, at said transition point said diffraction grating and said monofocal central zone have coinciding amplitude values such that said transition point is located closer to a crest amplitude value than a trough amplitude value of said diffraction grating; and applying said monofocal central zone and said diffraction grating in accordance with said determined transition point.

14. The method according to claim 13, wherein said transition point is located such that a distance between said transition point and said crest amplitude value measured in radial direction r of said lens body, when viewed in $r^2$ space, is less than 0.25 times a period of said diffraction grating in $r^2$ space.

15. The method according to claim 13, wherein said transition point is located such that a distance between said transition point and said crest amplitude value measured in radial direction r of said lens body, when viewed in $r^2$ space, is less than 0.2 times a period of said diffraction grating in $r^2$ space.

16. The method according to claim 13, wherein at least one of said amplitude profile h(r) of said monofocal central zone and said amplitude profile H(r) of said diffraction grating is providing coinciding amplitude values of said monofocal central zone and said diffraction grating at said transition point.

17. The method according to claim 13, further comprising determining said transition point and a shift in radial direction of said diffraction grating based on a distribution in said target focal points of light incident on said ophthalmic multifocal lens, such that for a given aperture size:

intensities of light distributed in each of said target focal points are within a predetermined intensity range for each individual target focal point, and a sum intensity of light distributed in said target focal points is in a predetermined summation range, and a ratio of intensities of light distributed in said target focal points for far and near vision is in a predetermined ratio range.

18. The method according to claim 13, wherein the ophthalmic multifocal lens is arranged as one of a contact lens, an intraocular lens, an aphakic contact lens, an aphakic intraocular lens, or a spectacle lens.

* * * * *